US007403509B2

(12) United States Patent
Giannakis et al.

(10) Patent No.: US 7,403,509 B2
(45) Date of Patent: Jul. 22, 2008

(54) RECEIVER FOR CHIP-INTERLEAVED BLOCK-SPREAD MULTI-USER COMMUNICATION SYSTEMS

(75) Inventors: Georgios B. Giannakis, Minnetonka, MN (US); Shengli Zhou, Ashford, CT (US)

(73) Assignee: Regents of the University of Minnesota, Minneapolis, MN (US)

( * ) Notice: Subject to any disclaimer, the term of this patent is extended or adjusted under 35 U.S.C. 154(b) by 712 days.

(21) Appl. No.: 10/841,806

(22) Filed: May 7, 2004

(65) Prior Publication Data

US 2005/0135314 A1     Jun. 23, 2005

Related U.S. Application Data

(60) Provisional application No. 60/469,611, filed on May 9, 2003.

(51) Int. Cl.
  *H04B 7/16* (2006.01)
(52) U.S. Cl. .................. 370/335; 370/320; 370/310
(58) Field of Classification Search ............ 370/335, 370/320
  See application file for complete search history.

(56) References Cited

U.S. PATENT DOCUMENTS

| | | | |
|---|---|---|---|
| 5,757,845 | A | 5/1998 | Fukawa et al. |
| 6,188,717 | B1 | 2/2001 | Kaiser et al. |
| 6,377,615 | B1 | 4/2002 | Sourour et al. |
| 6,574,202 | B1 | 6/2003 | Himayat et al. |
| 2004/0120274 | A1* | 6/2004 | Petre et al. .............. 370/320 |

OTHER PUBLICATIONS

3GPP Technical Report, 3G TR 25.943, "3rd Generation Partnership Project: Technical Specification Group (TSG) RAN WG4; Deployment Aspects," 14 pgs, 1999.

A. Klein, "Data Detection Algorithms Specially Designed for the Downlink of CDMA Mobile Radio Systems," 1997 IEEE 47th Vehicular Technology Conference, Phoenix, AZ, pp. 203-207, May 1997.

A. Klein et al., "Zero Forcing and Minimum Mean-Square-Error Equalization for Multiuser Detection in Code-Division Multiple-Access Channels," IEEE Transactions on Vehicular Technology, vol. 45, No. 2, pp. 276-287, May 1996.

(Continued)

*Primary Examiner*—Vincent P. Harper
*Assistant Examiner*—Phuoc Doan
(74) *Attorney, Agent, or Firm*—Shumaker & Sieffert, P.A.

(57) ABSTRACT

Techniques are described for performing block equalization on a received wireless communication signal formed according to interleaved chips generated from sub-blocks of symbols. For example, a one-step block equalization process is described which produces estimates of the information-bearing symbols from a wireless communication signal received from two or more transmitters in a soft handoff environment. The techniques provide improved performance in high load, soft handoff environments with low complexity, highly flexible equalization. The wireless communication signal may be a CIBS-CDMA signal in which a symbol block is divided into sub-blocks and spread by a user-specific block-spreading matrix. The CIBS signal is received through M subchannels and a de-spreading matrix is applied to produce a multi-user interference (MUI) free sub-block output for the $m^{th}$ channel. One-step block equalization comprises forming a single block from the m de-spread sub-blocks and performing block equalization on the single block.

24 Claims, 14 Drawing Sheets

OTHER PUBLICATIONS

A. Ruiz et al., "Discrete Multiple Tone Modulation with Coset Coding for the Spectrally Shaped Channel," IEEE Transactions on Communications, vol. 40, No. 6, pp. 1012-1029, Jun. 1992.

A. Scaglione et al., "Redundant Filterbank Precoders and Equalizers Part I: Unification and Optimal Designs," IEEE Transactions on Signal Processing, vol. 47, No. 7, pp. 1988-2006, Jul. 1999.

A. Stamoulis et al., "Block FIR Decision-Feedback Equalizers for Filterbank Precoded Transmissions with Blind Channel Estimation Capabilities," IEEE Transactions on Communications, vol. 49, No. 1, pp. 69-83, Jan. 2001.

C.D. Frank et al., "Adaptive Interference Suppression for the Downlink of a Direct Sequence CDMA System with Long Spreading Sequences", Journal of VLSI Signal Processing 30, vol. 30, No. 1, pp. 273-291, Mar. 2002.

F. Petre et al, "Downlink Frequency-Domain Chip Equalization for Single-Carrier Block Transmission DS-CDMA with Known Symbol Padding," Procedures of GlobeCom, Taipei, Taiwan, pp. 453-457, Nov. 2002.

F. Petre et al., "Semi-Blind Space-Time Chip Equalizer Receivers For WCDMA Forward Link With Code-Multiplexed Pilot," 2001 IEEE International Conference on Acoustics, Speech, and Signal Processing, vol. IV of VI, Salt Lake City, UT, pp. 2245-2248, May 2001.

G. Leus et al., "MUI-Free Receiver for a Shift-Orthogonal Quasi-Synthronous DS-CDMA System Based on Block Spreading in Frequency-Selective Fading," 2000 IEEE International Conference on Acoustics, Speech, and Signal Processing, vol. V and VI, Istanbul, Turkey, pp. 2497-2500, Jun. 2000.

G. Leus et al., "MUI-Free Receiver for a Synchronous DS-CDMA System Based on Block Spreading in the Presence of Frequency-Selective Fading," IEEE Transactions on Signal Processing, vol. 48, No. 11, pp. 3175-3188, Nov. 2000.

G.B. Giannakis et al., "Amour-Generalized Multicarrier Transceivers for Blind CDMA Regardless of Multipath," IEEE Transactions on Communications, vol. 48, No. 12, pp. 2064-2076, Dec. 2000.

H. Sari et al., "Orthogonal Frequency-Division Multiple Access and its Application to CATV Networks," European Transactions on Telecommunications, vol. 9, No. 6, pp. 507-516, Nov./Dec. 1998.

H.A. Cirpan et al., "Chip Interleaving in Direct Sequence CDMA Systems," 1997 IEEE International Conference on Acoustics, Speech, and Signal Processing, vol. V of V, Munich, Germany, pp. 3877-3880, Apr. 1997.

H.V. Poor et al., "Probability of Error in MMSE Multiuser Detection," IEEE Transactions on Information Theory, vol. 43, No. 3, pp. 858-871, May 1997.

I. Ghauri et al., "Linear Receivers for the DS-CDMA Downlink Exploiting Orthogonality of Spreading Sequences," Procedures of Asilomar Conference on Signals, Systems, and Computers, Pacific Grove, CA, vol. 1, pp. 650-654, Nov. 1998.

J. Lou et al., "Near-Optimal Multiuser Detection in Synchronous CDMA Using Probabilistic Data Association," IEEE Communication Letters, vol. 5, No. 9, pp. 361-363, Sep. 2001.

J.A.C. Bingham, "Multicarrier Modulation for Data Transmission: An Idea Whose Time Has Come," IEEE Communications Magazine, pp. 5-8 and 11-14, May 1990.

K. Hooli et al, "Multiple Access Interference Suppression With Linear Chip Equalizers in WCDMA Downlink Receivers," Global Telecommunications Conference, Rio do Janeiro, Brazil, vol. 1 of 5, pp. 467-471, Dec. 1999.

L. Mailaender, "Low-Complexity Implementation of CDMA Downlink Equalization," 3G Mobile Communication Technologies, pp. 396-400, Mar. 2001.

M. Haardt et al., "The TD-CDMA Based UTRA TDD Mode," IEEE Journal on Selected Areas in Communications, vol. 18, No. 8, pp. 1375-1385, Aug. 2000.

R.G. Vaughan, "Polarization Diversity in Mobile Communications," IEEE Transactions On Vehicular Technologies, vol. 39, No. 3, pp. 177-186, Aug. 1990.

S. Zhou et al., "Finite-Alphabet Based Channel Estimation for OFDM and Related Multicarrier Systems," IEEE Transactions on Communications, vol. 49, No. 8, pp. 1402-1414, Aug. 2001.

S. Zhou et al., "Chip Interleaved Block-Spread Code Division Multiple Access," IEEE Transactions on Communications, vol. 50, No. 2, pp. 235-248, Feb. 2002.

T.P. Krauss et al., "Simple MMSE Equalizers for CDMA Downlink to Restore Chip Sequence: Comparison to Zero-Forcing and RAKE," 2000 IEEE International Conference on Acoustics, Speech, and Signal Processing, vol. V of VI, Istanbul, Turkey, pp. 2865-2868, Jun. 2000.

T.P. Krauss et al., "Downlink Specific Linear Equalization for Frequency Selective CDMA Cellular Systems," Journal of VLSI Signal Processing, vol. 30, pp. 143-161, Mar. 2002.

X. Wang et al., "Iterative (Turbo) Soft Interference Cancellation and Decoding for Coded CDMA," IEEE Transactions on Communications, vol. 47, No. 7, pp. 1046-1061, Jul. 1999.

Z. Wang et al., "Wireless Multicarrier Communications: Where Fourier Meets Shannon," IEEE Signal Processing Magazine, pp. 29-48, May 2000.

* cited by examiner

RECEIVER FOR CHIP-INTERLEAVED BLOCK-SPREAD MULTI-USER COMMUNICATION SYSTEMS

This application claims priority from U.S. Provisional Application Ser. No. 60/469,611, filed May 9, 2003, the entire content of which is incorporated herein by reference.

STATEMENT REGARDING FEDERALLY SPONSORED RESEARCH OR DEVELOPMENT

This invention was made with Government support under Contract No. CCR-0105612, awarded by the National Science Foundation, and Contract No. DAAD19 01-2-0011 (University of Delaware Subcontract No. 497420) awarded by the U.S. Army. The Government may have certain rights in the invention.

TECHNICAL FIELD

The invention relates to communication systems and, more particularly, receivers for use in multi-user communication systems.

BACKGROUND

In multi-user wireless communication systems, such as mobile phone networks, wireless local area networks, and satellite communications, multiple transmitters and receivers may communicate simultaneously through a common wireless communication medium. One communication format widely used by multi-user systems is Code Division Multiple Access (CDMA), in which the transmitters generate orthogonal waveforms that can be separated by the receivers thereby enabling simultaneous transmissions from multiple users over the same time-bandwidth slot. More specifically, each transmitter applies one code chosen from a set of orthogonal "spreading codes" to an outbound serial stream of "symbols." Each symbol represents a discrete information bearing value selected from a finite set ("alphabet"). For example, simple alphabets used by transmitters may be $\{+1,-1\}$ or $\{-3,-1,+1,+3\}$. The application of the orthogonal spreading codes to the symbols produces a set of "chips" for each symbol to be transmitted. The resulting chips are transmitted according to some modulation scheme, such as quadrature phase shift keying (QPSK) modulation. In order to separate signals from multiple users, the receivers isolate the signal of the desired user by matching the signal to the corresponding orthogonal spreading code.

When the transmission rate increases, the communication medium can become "frequency selective" in that certain frequencies exhibit significant fading, i.e., significant loss of signal. This property often causes inter-chip interference (ICI) in which the transmitted chips for a particular symbol interfere with each other, destroying the orthogonality of the waveforms at the receiver. By rendering the transmitted waveforms non-orthogonal, ICI can lead to multiple user interference (MUI), in which the receivers are unable to correctly separate the waveforms, eventually leading to data loss and/or bandwidth and power inefficiencies. In addition to intra-cell interferences, inter-cell interference also arises from the transmission of waveforms from nearby base stations. Inter-cell interference is most severe when a user is at the edge of a cell. In CDMA wireless communication systems, soft handoffs are employed to allow a mobile station to communicate with multiple base stations simultaneously, improving the transmission quality of the wireless communication medium and avoiding disconnection upon base station switching. Soft handoff techniques substantially reduce the ping-pong effect when the mobile user is on the edge of two cells, and has to switch between two base stations frequently. In the soft handoff mode, the same information block of the desired user is transmitted simultaneously from all candidate base stations.

Various techniques have been developed that attempt to suppress the effects of MUI. For example, various linear and non-linear "multi-user detectors" have been developed for separating non-orthogonal user waveforms. These detectors, however, typically use techniques that require knowledge of the characteristics of the current communication medium and that are often complex and expensive to implement in typical mobile communication devices. As a result, these detectors are more suitable for uplink transmissions, where the base station has knowledge of the multipath channels and spreading codes of all users, and is thus able to demodulate all users' information either jointly, or, separately. In addition, alternatives to CDMA have been proposed including multicarrier (MC) spread spectrum based multiple access, e.g., (generalized) MC-CDMA and Orthogonal Frequency Division Multiple Access (OFDMA), where complex exponentials are used as information-bearing carriers to maintain orthogonality in the presence of frequency selective channels. Multicarrier schemes are power inefficient because their transmissions have non-constant magnitude in general, which causes power amplifiers to operate inefficiently. These alternatives can also be very complex and expensive to implement and do not necessarily compensate for channels that introduce significant fading.

SUMMARY

In general, the invention is directed to techniques for performing block equalization on block-spread wireless communication signal received via one or more channels. Unlike conventional systems, e.g. direct sequence (DS)-CDMA, in which equalization is performed on a chip level basis prior to de-spreading on a per symbol basis, the techniques described herein perform block equalization to generate a block of symbol estimates subsequent to de-spreading the received signal into respective streams of de-interleaved chips for each of the channels. In particular, the received wireless communication signal is a chip-interleaved block-spread (CIBS) signal transmitted through a wireless communication channel via one or more transmitters. Moreover, the signal is received in a soft handoff environment and estimates of the information-bearing symbols are produced via a one-step block equalization process.

In one embodiment, a method comprises receiving a block-spread wireless communication signal via one or more channels; de-spreading the received signal to form a respective stream of de-interleaved chips for each of the one or more channels; and performing a block equalization process to generate a block of symbol estimates from the streams of de-interleaved chips.

In another embodiment, a wireless communication device comprising one or more antennas that receive a block-spread wireless communication signal via one or more channels; a de-spreading unit that forms a respective stream of de-interleaved chips for each of the channels; and a block equalizer that generates a block of symbol estimates from the streams of de-interleaved chips.

In another embodiment, the invention is directed to a computer-readable medium containing instructions. The instructions cause a programmable processor to receive via one or more channels a chip-interleaved, block-spread (CIBS) wireless communication signal formed according to interleaved chips; de-spread the received signal to form a stream of de-interleaved chips for each of the one or more channels; and perform a single-step block equalization process to generate a block of symbol estimates from the streams of de-interleaved chips. The processor performs the single-step equalization process by collecting chips from each of the streams of de-interleaved chips associated with the different channels to form a vector of chips, and processing the vector with a block equalization matrix to produce the block of symbol estimates as a vector of symbol estimates.

The described techniques may offer one or more advantages. For example, instead of producing symbol estimates in two steps by forming symbol estimates from the signal received for each transmitter and then combining the symbol estimates to form a final symbol estimate, as is common with conventional equalizers, one-step block equalization may be performed in which the received signals from each transmitter are collected into a vector and processed by applying a block equalization matrix to produce the block of symbol estimates as a vector of symbol estimates. Further, the one-step block equalization can produce symbol estimates regardless of the number of subchannels. Moreover, because a matrix inversion of size K is required, where K represents the number of information symbols per sub-block, there is no complexity increase relative to the conventional two-step equalization.

Other advantages of performing block equalization include the potential increase in the number of equivalent subchannels in CIBS-CDMA by exploiting the base station induced diversity. Furthermore, because intra-cell users are decoupled in CIBS-CDMA, increasing the power of a particular user does not affect the performance of other users and optimal power control allocation can be performed on a per user basis. Thus, inter-cell interference may be substantially reduced. Additionally, the described techniques provide flexibility in the design of the block equalizer, i.e. the described techniques can be used with both linear and non-linear equalizers as well as serial equalizers.

The details of one or more embodiments of the invention are set forth in the accompanying drawings and the description below. Other features, objects, and advantages of the invention will be apparent from the description and drawings, and from the claims.

DETAILED DESCRIPTION

Throughout the Detailed Description bold upper letters denote matrices, bold lower letters stand for column vectors, $(\bullet)^T$ and $(\bullet)^H$ denote transpose and Hermitian transpose, respectively; $\otimes$ denotes the Kronecker product and $\delta[\bullet]$ denotes the Kronecker delta. $E[\bullet]$ stands for ensemble expectation; $I_K$ denotes the K×K identity matrix, and $0_{M \times N}$ denotes the M×N matrix; $[\bullet]_p$ stands for the $(p+1)^{st}$ entry of a vector, and $[\bullet]_{p,q}$ stands for the $(p+1, q+1)^{st}$ element of a matrix. Throughout the Detailed Description, k is used to index symbols, n for chips, and u for users.

Figure 1:
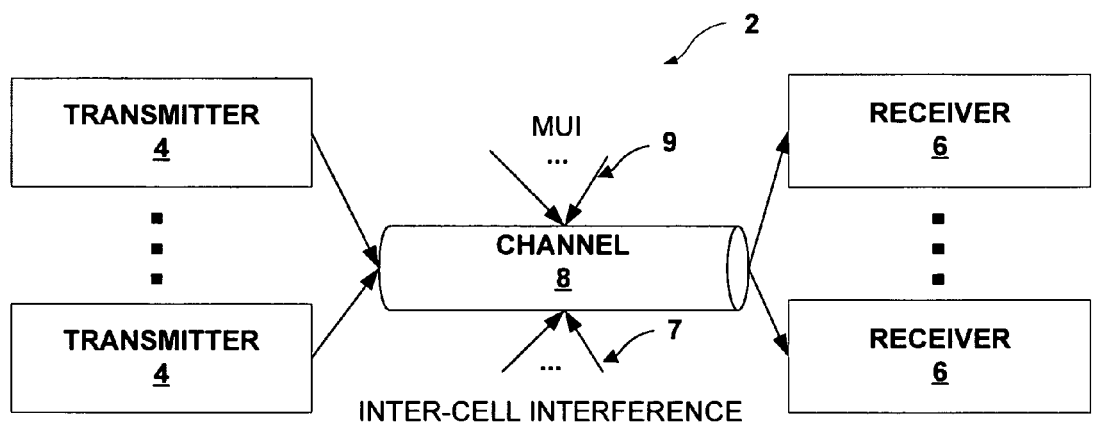
FIG. 1 is a block diagram illustrating an exemplary wireless multi-user communication system in which multiple transmitters communicate with multiple receivers through a wireless communication channel.

FIG. 1 is a block diagram illustrating a multi-user wireless communication system 2 in which multiple transmitters 4 communicate with multiple receivers 6 through wireless channel 8. In general, the invention describes techniques for producing a block of symbol estimates at receivers 6. In particular, receivers 6 receive a block-spread wireless communication signal via one or more channels 8, de-spread the received signal to form respective streams of de-interleaved chips for each of the channels, and generate a block of symbol estimates from the streams of de-interleaved chips. As described herein, the techniques may substantially suppress undesirable effects common in wireless communication systems operating in a soft-handoff environment such as multiple user interference (MUI) 9 and inter-cell interference 7.

Transmitters 4 rely on chip interleaved block-spreading code division multiple access (CIBS-CDMA) to maintain code orthogonality among different users wireless communication signals even after frequency-selective propagation, enabling a substantial reduction in multiple-user interference (MUI) 9 with low complexity code-matched filtering at receiver 6. Because the wireless communication signals remain orthogonal, single user detectors can be used. Furthermore, transmitters 4 may be located in two or more base stations and simultaneously transmit CIBS-CDMA communication signals to multiple receivers 6 through communication channel 8. As a result communication system 2 is also subject to inter-cell interference 7 and receivers 6 utilize soft-handoff operations to eliminate the ping-pong effect when a mobile user is on the edge of two cells and has to switch between two base stations frequently. The CIBS-CDMA transmission techniques are described in further detail in U.S. patent application Ser. No. 09/838,621, entitled "CHIP-INTERLEAVED, BLOCK-SPREAD MULTI-USER COMMUNICATION," filed Apr. 19, 2001, the entire contents of which are incorporated herein by references.

The techniques described may be applied to downlink transmissions, i.e., transmissions from a base station to a mobile device. Moreover, transmitters 4 and receivers 6 may be any device configured to communicate using a multi-user wireless transmission including a cellular distribution station, a hub for a wireless local area network, a cellular phone, a laptop or handheld computing device, a personal digital assistant (PDA), a Bluetooth™ enabled device and the like.

Figure 2:
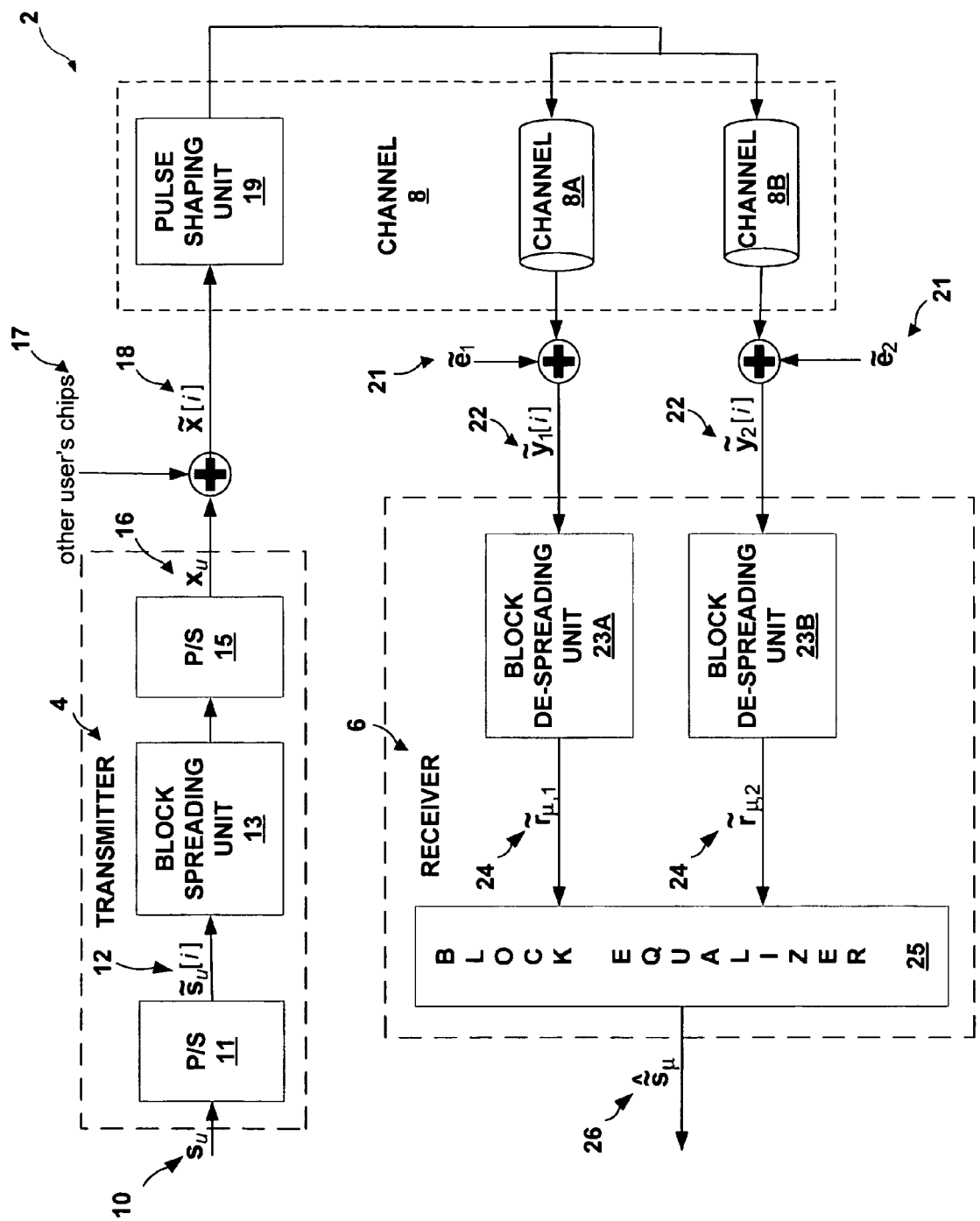
FIG. 2 is a block diagram illustrating in further detail the multi-user communication system of FIG. 1.

FIG. 2 is a block diagram illustrating in further detail the multi-user communication system 2 of FIG. 1. In particular, FIG. 2 illustrates exemplary embodiments of transmitter 4 and receiver 6 in further detail.

Generally, each of receivers 6 corresponds to a different user and produces blocks of symbol estimates 26 of information-bearing symbols by applying block equalizer 25 to the de-spread 24 chips formed from the CIBS-CDMA communication signal received through channel 8. Transmitter 4 transmits CIBS-CDMA communication signals in a frame by frame fashion, each frame corresponding to one time slot in time division (TD)-CDMA based UMTS terrestrial radio access (UTRA) time division duplex (TDD) mode. During each frame, the number of users U is constant, and channel 8 remains invariant. For brevity, channel estimation is performed once per frame and the channel estimates are assumed to be perfect at receivers 6. Each user transmits $K_f$ symbols per frame collected in the information block $s_u := [s_u[0], \ldots, s_u[K_f-1]]^T$ 10 where $u \in \{1, \ldots, U\}$. Denoting the chip interval as $T_c$ and the frame interval as $T_f$, each frame contains $N_f := T_f/T_c$ chips. In general, each user is assigned a user-specific orthonormal spreading code $c_u$, i.e. $c_u^H c_{u'} = \delta[u-u']$, of length $P_{CIBS}$. All chips of the code $C_u$ have amplitude $1/\sqrt{P_{CIBS}}$. Each block is spread by $c_u$ to yield $P_{CIBS}$ chips, the corresponding to $K_f$ information symbols are concatenated to form a frame that is scrambled by a block-specific overlay (long scrambling) code, and padded by $N_{guard}$ zeros to avoid inter-frame interference.

Specifically, serial to parallel converter (S/P) 11 parses outbound data 10 from a serial stream of symbols into $N_{sb}$ smaller sub-blocks $s_u := [\tilde{s}_u^T[0], \ldots, \tilde{s}_u^T[N_{sb}-1]]^T$. Each sub-block $\tilde{s}_u[i]$ 12 has length $K = K_f/N_{sb}$. Throughout the Detailed Description the term "sub-block" is generically used in reference to a block of data and is not limited to a particular size. Block spreading unit 13 applies the $N_f \times K_f$ block-spreading matrix $\mathcal{C}_u[i]$ of user u to each sub-block 12. It is important to note that the scrambling code is applied in a sub-block by sub-block fashion, rather than in a symbol by symbol fashion as in DS-CDMA. The tall block-spreading matrix $\mathcal{C}_u[i]$ is designed in accordance with equation (1) where $T_K := [I_K, 0^{K \times L}]^T$ describes the guard inserting operation, and $\Delta[i]$ is a $P_{CIBS} \times P_{CIBS}$ diagonal matrix holding on its diagonal the scrambling code with each chip having unit amplitude.

$$\tilde{C}_u[i] = \tilde{D}_u[i]T_K, \text{ with } \tilde{D}_u[i] = (\Delta[i]c_u) \otimes I_{K+L} \tag{1}$$

The scrambling matrix $\Delta[i]$ changes from frame to frame, but is identical for all users in the same cell. Different scrambling codes are deployed in different cells for cell identification and inter-cell interference suppression purposes. Block-spreading unit 13 can be implemented by conventional symbol-spreading of K symbols with $\Delta[i]c_u$, followed by a redundant chip interleaver. From equation (1) the chip block $\mathcal{C}_u[i]\tilde{s}_u[i]$ has length $(K+L)P_{CIBS}$ where L represents a number of guard chips determined by the effective length of communication channel 8 in discrete time, such as 5, 10, or 15 chips long. $P_{CIBS}$ represents the length of the user-specific code, i.e. the maximum number of users that can be supported simultaneously. Alternatively, transmitter 4 can pad the chip block with non-zero known symbols. Receiver 6 first subtracts the contributions from the known symbols and then applies block de-spreading units 23A, 23B on the resulting chip sequence. The inserted known symbols can be judiciously designed to assist receiver 6 at the demodulation stage. Instead of zero padding, cyclic prefix insertion can also be employed in communication system 2. Cyclic prefix insertion may reduce the complexity of receiver 6 when block equalizer 25 takes the form of a MMSE block equalizer because the block equalization reduces to a frequency domain equalization.

Parallel to serial converter (P/S) 15 parses the chip blocks $\{\mathcal{C}[i]\tilde{s}_u[i]\}_{i=0}^{N_{sb}-1}$ to form the chip vector $x_u$ 16, and other user's chips blocks are subsequently added 17 to form the multi-user chip sequence x 18 in accordance with equation (2). Information block $s_u$ is spread to form an $N_f \times 1$ chip block $x_u := C_u s_u$, where $C_u$ represents the $N_f \times K_f$ spreading matrix of user u. For synchronous transmissions, the base station sums all users' chip sequences to obtain equation (3) where the weight $A_u$ controls the $u^{th}$ user's transmit-power. For each frame containing $N_f = N_{sb}(K+L)P_{CIBS}$ chips, spreading matrix $C_u$ is defined according to equation (3).

$$x := \sum_{u=1}^{U} A_u x_u = \sum_{u=1}^{U} A_u C_u s_u \tag{2}$$

$$C_u = \text{diag}(\tilde{C}_u[0], \ldots, \tilde{C}_u[N_{sb}-1]) \tag{3}$$

The $i^{th}$ transmitted chip vector $$\tilde{x}[i] = \sum_{u=0}^{U} A_u \tilde{C}_u[i]\tilde{s}_u[i]$$

has the last L entries equal to zero by design in order to substantially eliminate interference from adjacent sub-blocks. Pulse shaper 17 modulates $\tilde{x}[i]$ to a higher frequency and is transmitted as a CIBS-CDMA wireless communication signal through communication channel 8. This discrete time-time baseband equivalent channel 8 between transmitter 4 and the $m^{th}$ receiver ($m \in \{1, 2, \ldots, M\}$) 6, where L is an upper bound on the channel order is denoted $h_m := [h_m[0], \ldots, h_m[L]]^T$. This equivalent channel includes the physical channels 8A and 8B as well as pulse shaping filter 19. The channel order L is typically over estimated as $L = \lceil(\tau_{s, max} + T_{support} + \tau_{margin})/T_c\rceil$ where $\tau_{s, max}$ is the maximum channel delay spread, $T_{support}$ is the non-zero support of the filter obtained by linearly convolving the transmit-filter with the receive-filter, and $\tau_{margin}$ allows the signals from an interfering transmitter to be margin seconds off the signals from transmitter 4, i.e. the asynchronism among transmitters is included as zero taps in the discrete-time equivalent channels.

At receiver 6, multi-channel reception is available. For example, multiple receive antennas can be deployed at receiver 6 to boost system performance. Due to size limitations, a receiver can typically deploy up to two $M_r = 2$ receive antennas, as illustrated for exemplary purposes in FIG. 2. Alternatively, multi-channel reception becomes available by sampling the received signal at rate $M_s/T_c$, where $M_s$ represents the oversampling factor. Both multi-antenna reception and oversampling generally create multiple channels. In general, multi-antenna reception yields independent channels while oversampling generally results in dependent channels, which makes a difference in performance.

For purposes of illustration, FIG. 2 depicts independent channels 8A and 8B created by two receive antennas, although the techniques are not limited as such. In some embodiments, each receive antenna is oversampled by $M_s$ creating a system with $M = M_r M_s$ effective channels. This includes single antenna reception with no oversampling as a special case corresponding to $M = M_r = M_s = 1$.

At receiver 6, the received vector $y_m$ 22 is spread into $N_{sb}$ blocks $y_m := [\tilde{y}_m^T[0], \ldots, \tilde{y}_m^T[N_f-1]]^T$ Consequently, $\tilde{y}_m[i]$ 22 contains contributions only from the $i^{th}$ information sub-blocks $\{\tilde{s}_u[i]\}_{u=1}^U$. Therefore, $\tilde{x}[i]$ can be viewed as a short frame of length $\tilde{N}_f = (K+L)P_{CIBS}$ with carefully designed guard intervals. Accordingly, equation (4) defines the received sub-blocks at receiver 6 where $H_m$ is the lower triangular $\tilde{N}_f \times \tilde{N}_f$ Toeplitz matrix with $[H_m]_{p,q} = h_m[p-q]$ and $\tilde{e}_m[i]$ 21 is the additive channel noise that also includes inter-cell interference 7 from nearby transmitters and MUI 9.

$$\tilde{y}_m[i] = \tilde{H}_m \tilde{x}[i] + \tilde{e}_m[i] \tag{4}$$

Using equation (1) and knowledge of CIBS-CDMA, it follows that $\check{e}_u[i]$ lies in the column space of de-spreading matrix $\mathcal{D}_u[i]$ after propagation through a frequency selective channel, i.e. $\overline{H}_m \check{e}_u[i] = \mathcal{D}_u[i]\overline{H}_m$, where $\overline{H}_m$ is a $(K+L) \times K$ Toeplitz matrix having $(p+1, q+1)^{st}$ entry as given in equation (5).

$$[\overline{H}_m]_{p,q} = h_m[p-q] \tag{5}$$

Therefore, equation (4) can be rewritten according to equation (6).

$$\tilde{y}_m[i] = \tilde{H}_m \sum_{u=1}^{U} \left( A_u \tilde{C}_u[i] \tilde{s}_u[i] \right) + \tilde{e}_m[i] \tag{6}$$

$$= \sum_{u=1}^{U} A_u \tilde{D}_u[i] \overline{H}_m \tilde{s}_u[i] + \tilde{e}_m[i]$$

Because $\mathcal{D}_u[i]$ maintains mutual orthogonality among users, i.e. $\mathcal{D}_u^H \mathcal{D}_{u'} = \delta[u-u'] I_{K+L}$, block de-spreading unit 23A and 23B de-spreads each block $\tilde{y}_m[i]$ using $\mathcal{D}_u[i]$ to obtain a MUI free output from the $m^{th}$ channel, respectively, for the desired user $\mu$. The MUI free output is given according to equation (7) where $\tilde{\eta}_{\mu,m}[i] := \mathcal{D}_\mu^H[i]\tilde{e}_m[i]$ is the AWGN.

$$\tilde{r}_{\mu,m}[i] := \tilde{D}_\mu^H[i]\tilde{y}_m[i] = A_\mu \overline{H}_m \tilde{s}_\mu[i] + \tilde{\eta}_{\mu,m}[i] \tag{7}$$

The MUI free output $\{\tilde{r}_{\mu,m}[i]\}_{m=1}^M$ 24A and 24B can be collected into a single vector $\tilde{r}_\mu[i] := [\tilde{r}_{\mu,1}^T[i], \ldots, \tilde{r}_{\mu,M}^T[i]]^T$ (collectively "24") and $\overline{\overline{H}}$ can be defined according to equation (8), where equation (8) has dimensionality given in equation (9).

$$\overline{\overline{H}} := [\overline{H}_1^T, \ldots, \overline{H}_M^T]^T \tag{8}$$

$$M(K+L) \times K \tag{9}$$

Consequently, defining $\tilde{\eta}_\mu[i]$ similar to $\tilde{r}_\mu[i]$ 24 allows equation (7) to be rewritten as equation (10). Equation (10) shows that after de-spreading by $\mathcal{D}_u[i]$ the MUI from the same cell is removed deterministically without knowing the channels. As a result, single user channel equalization can be performed on equation (10). It is of importance to note that different from DS-CDMA, multi-user separation in CIBS-CDMS is performed before channel equalization. The small size of symbol blocks makes block equalization efficient. CIBS-CDMA receiver 6 relies on block equalizer $G_\mu$ 25 with dimensionality $K \times M(K+L)$ to estimate the $i^{th}$ symbol sub-block in accordance with equation (11).

$$\tilde{r}_\mu[i] = A_\mu \overline{\overline{H}} \tilde{s}_\mu[i] + \tilde{\eta}_\mu[i] \tag{10}$$

$$\hat{s}_\mu[i] = G_\mu \tilde{r}_\mu[i] \tag{11}$$

Assuming that $s_\mu[k]$ is white with variance $\sigma_s^2$, $E\{\tilde{s}_\mu[i]\tilde{s}_\mu^H[i]\} = \sigma_s^2 I_K$. Defining $R_\eta := E\{\tilde{\eta}_\mu[i]\tilde{\eta}_\mu^H[i]\}$, linear zero forcing (ZF) and minimum mean square error (MMSE) block symbol equalizers are expressed in accordance with equations (12) and (13) respectively.

$$G_\mu^{ZF} = \left[(A_\mu \overline{\overline{H}})^H R_\eta^{-1} (A_\mu \overline{\overline{H}})\right]^{-1} (A_\mu \overline{\overline{H}})^H R_\eta^{-1} \tag{12}$$

$$G_\mu^{MMSE} = \left[(A_\mu \overline{\overline{H}})^H R_\eta^{-1} (A_\mu \overline{\overline{H}}) + \frac{1}{\sigma_s^2} I_K\right]^{-1} (A_\mu \overline{\overline{H}})^H R_\eta^{-1} \tag{13}$$

The ZF equalizer of equation (12) exists even when M=1 because the $(K+L) \times K$ channel matrix $\overline{H}_m$ has full column rank K by construction, regardless of the channel $h_m$.

Block equalizer 25 is not limited to the ZF and MMSE equalizers of equations (12) and (13) respectively. Non-linear equalizers, e.g. the block Decision Feedback Equalizer (DFE) and the probabilistic data association (PDA) method are also applicable. In addition, serial equalizers can also be employed. Specifically, because $\tilde{r}_{\mu,m}$ 24 is the linear convolution of $h_m$ with $\tilde{s}_\mu[i]$, treating $\tilde{s}_\mu[i]$ as the chip block $z_u = D_u s_u$ in DS-CDMA in which the guard chips are absent, and treating the MUI free output $\tilde{r}_{\mu,m}$ as the received sequence $y_m$, serial linear equalizers can be derived for CIBS-CDMA. The derivations of serial equalizers are skipped for brevity.

Although FIG. 2 illustrates a single transmitter 4, communication system 2 may operate in the presence of inter-cell interference 7, MUI 9, and employs soft hand off operation. Inter-cell interference 7 arises from nearby transmitters 4. Typically, transmitters 4 are synchronized in a cellular configuration and a transmitter is located at the center of each cell. When a receiver is located at the edge of its cell, there are only a few transmitters that cause significant interference. For brevity, the following analysis considers one interfering transmitter, but is not limited to one interfering base station. Generalizations to two or more interfering base stations are straightforward and within the scope of the following analysis.

Herein, the host transmitter 4 is denoted as A, and the interfering transmitter is denoted as B. $(\bullet)^a$ and $(\bullet)^b$ or, when more convenient, $(\bullet)_a$ and $(\bullet)_b$ denote the variables associated with transmitters A and B, respectively. In the presence of inter-cell interference 7, the received CIBS-CDMA signal $y_m$ 22 can be written in accordance with equation (14) where $w_m$ denotes AWGN with variance $= \sigma_w^2 I_{N_f}$.

$$y_m = H_m^a x^a + e_m = H_m^a x^a + H_m^b x^b + w_m \tag{14}$$

The system model of equation (14) requires block synchronism for the received waveforms for both transmitters. For this purpose, the channel order L is typically over estimated as $L = \lceil (\tau_{s,max} + T_{support} + \tau_{margin})/T_c \rceil$, which allows the waveforms from the interfering transmitter to be $\tau_{margin}$ seconds off the waveforms from the desired station, i.e. the synchronism among transmitters is included as zero taps in the discrete-time equivalent channels. Typically, CIBS-CDMA is best suited for small cells, e.g. micro and pico cells, which is a typical application scenario for the TD-CDMA based UTRA TDD mode. The paths from the interfering transmitter with delays larger than $\tau_{s,max} + \tau_{margin}$ are treated as additive noise. Such paths usually have negligible power, as is the case when the mobile user is located close to the center of the cell. Expressing the error term $e_m$ in equation (13) as a structured interference plus AWGN enables simplification of the previously described equalizers.

The following section analyzes the structure of inter-cell interference in downlink CIBS-CDMA and drops the sub-block index i for notation convenience.

Starting from equation (14) the received CIBS-CDMA waveform is rewritten in accordance with equation (15) where the number of active users in cell A and cell B is denoted $U^a$ and $U^b$, respectively.

$$\tilde{y}_m = \tilde{H}_m^a \sum_{u=0}^{U^a} \left(A_\mu^a \tilde{C}_\mu^a \tilde{s}_\mu^a\right) + \tilde{H}_m^b \sum_{v=0}^{U^b} \left(A_v^b \tilde{C}_v^b \tilde{s}_v^b\right) + \tilde{w}_m \tag{15}$$

$$= \sum_{u=0}^{U^a} \left(A_\mu^a \tilde{D}_\mu^a \overline{H}_m^a \tilde{s}_\mu^a\right) + \sum_{v=0}^{U^b} \left(A_\mu^b \tilde{D}_\mu^a \overline{H}_m^a \tilde{s}_\mu^a\right) + \tilde{w}_m$$

At receiver 6 of user µ, de-spreading unit 23A applies $\tilde{D}_\mu^a$ to de-spread the received waveform and suppress intra-cell interference. The residual inter-cell interference plus noise in equation (7) can be rewritten as equation (16).

$$\tilde{\eta}_{\mu,m} = (\tilde{D}_\mu^a)^H \tilde{e}_m = \sum_{v=0}^{U^b} \left(A_v^b (\tilde{D}_\mu^a)^H \tilde{D}_v^b \overline{H}_m^b \tilde{s}_v^b\right) + (\tilde{D}_\mu^a)^H \tilde{w}_m \quad (16)$$

With $\rho_{\mu,v}^{a,b} = (\Delta^a c_\mu^a)^H (\Delta^b c_v^b)$ denoting the code correlation coefficient, it can be verified that block de-spreading units 23A, 23B satisfy equation (17) where de-spreading matrices $\tilde{D}_\mu^a$ and $\tilde{D}_v^b$ are applied for user µ and v, respectively.

$$(\tilde{D}_\mu^a)^H \tilde{D}_v^b = \left((\tilde{\Delta}^a c_\mu^a) \otimes \tilde{I}_{K+L}\right)^H \left((\tilde{\Delta}^b c_v^b) \otimes \tilde{I}_{K+L}\right) \quad (17)$$
$$= \rho_{\mu,v}^{a,b} \otimes I_{K+L} = \rho_\mu^{a,b} \otimes I_{K+L}$$

Consequently, $\eta_{\mu,m}$ can be further simplified in equation (16) as given in equation (18) where $$\tilde{s}_l^b := \sum_{v=0}^{U^b} A_v^b \rho_{\mu,v}^{a,b} \tilde{s}_v^b$$

denotes the inter-cell interference after de-spreading. Because $\Delta^a c_\mu^a$ and $\Delta^b c_v^b$ are equivalent to random codes having chips with amplitude $1/\sqrt{P_{CIBS}}$, the correlation coefficient $$\rho_{\mu,v}^{a,b}$$

is a zero-mean random variable with variance $1/P_{CIBS}$ and equation (18) is satisfied.

$$E\{\tilde{s}_l^b (\tilde{s}_l^b)^H\} = \left[\sum_{v=1}^{U^b} (A_v^b)^2 \sigma_s^2 \frac{1}{P_{cibs}}\right] I_K := \sigma_{I,b}^2 I_K \quad (18)$$

Collecting $\eta_\mu = [\eta_{\mu,1}^T, \ldots, \eta_{\mu,M}^T]^T$, $R_\eta$ can be defined in accordance with equation (19). Further, applying the matrix inversion lemma, the inverse of $R_\eta$ can be defined in accordance with equation (20). The matrix inversion which requires a matrix inversion of size K, which is significantly smaller than the inversion required in comparable DS-CDMA receivers requiring an inversion of size M(K+L).

$$R_\eta = \sigma_{I,b}^2 \overline{H}^b (\overline{H}^b)^H + \sigma_w^2 I_{m(K+L)} \quad (19)$$

$$R_\eta^{-1} = \frac{1}{\sigma_w^2}\left\{ I_{M(K+L)} - \overline{H}^b \times \left[(\overline{H}^b)^H \overline{H}^b + \frac{\sigma_w^2}{\sigma_{I,b}^2} I_K\right]^{-1} (\overline{H}^b)^H \right\} \quad (20)$$

The MMSE equalizer of equation (13) can then be re-expressed in accordance with equation (21) to cope with one interfering transmitter explicitly. Because the invention is not limited to dealing with one transmitter equation (21) can be expanded to deal with two or more transmitters. For brevity, the details of expanding equation (21) to deal with two or more transmitters are excluded. The ZF equalizer of equation (12) can be similarly found. When the inter-cell interference is negligible, the equalizers can be further simplified by using $R_\eta = \sigma_w^2 I_{m(K+L)}$.

$$G_\mu^{MMSE} = \left[(A_\mu \overline{H}^a)^H R_\eta^{-1} (A_\mu \overline{H}^a) + \frac{1}{\sigma_s^2} I_K\right]^{-1} \times (A_\mu \overline{H}^a)^H R_\eta^{-1} \quad (21)$$

The performance of the MMSE equalizer is now analyzed. For brevity, $G_\mu^{MMSE}$, is replaced by $G_\mu$. The estimate $\hat{s}_\mu$ 26 produced by block equalizer 23 for $\tilde{s}_\mu$ 10 with the MMSE equalizer design of equation (21) is obtained according to equation (22).

$$\hat{s}_\mu = G_\mu \tilde{r}_\mu = A_\mu G_\mu \overline{H}^a \tilde{s}_\mu + G_\mu \eta_\mu \quad (22)$$

The residual interference plus noise can be well approximate as additive Gaussian noise for MMSE equalizers. With symbol by symbol detection on $\hat{s}_\mu$ 26, equation (22) is equivalent to equation (23) below where $\hat{s}_{\mu,k}$ is the $k^{th}$ entry of $\hat{s}_\mu$ 26, the coefficient $\alpha_{\mu,k}$ can be expressed as $\alpha_{\mu,k} = [A_\mu G_\mu \overline{H}^a]_{k,k}$, and $n_{\mu,k}$ represents the residual interference-plus-noise with variance $\sigma_s^2(\alpha_{\mu,k} - \alpha_{\mu,k}^2)$. Therefore, the signal-to-interference-plus-noise ratio (SINR) for the $k^{th}$ symbol is given according to equation (24). The average bit error rate (BER) of the $\mu^{th}$ user, with binary phase shift keying (BPSK) signaling is given in equation (25) where the expectation is taken over random channel realizations.

$$\hat{s}_{\mu,k} = \alpha_{\mu,k} s_{\alpha\mu,k} + n_{\mu,k}, \quad \forall k = 0, \ldots, K-1 \quad (23)$$

$$SINR_{\mu,k} = \frac{\alpha_{\mu,k}}{1 - \alpha_{\mu,k}} \quad (24)$$

$$P_{e,\mu} = E\left\{\frac{1}{K} \sum_{k=0}^{K-1} Q\left(\sqrt{2SIRN_{\mu,k}}\right)\right\} \quad (25)$$

Similar to serial equalizers in DS-CDMA, serial equalizers for CIBS-CDMA can also be developed to explicitly suppress interference from one or more transmitters.

Receiver 6 also employs soft handoff operation to eliminate or reduce the "ping-pong" effect when the mobile user is on the edge of two cells, and has to switch between two transmitters frequently. In the soft handoff mode, the same information block for the desired user is transmitted simultaneously from all candidate transmitters. Typically, only two transmitters are involved. In the following analysis these two transmitters are denoted as A and B.

For downlink CIBS-CDMA, the final symbol estimate $\hat{s}_\mu$ 26 can be formed by first obtaining $\tilde{s}_\mu^a[i]$ and $\tilde{s}_\mu^b[i]$ and then combining the two estimated symbols from two transmitters.

However, it is also possible to perform one-step detection in receiver 6. In the previously mentioned two-step detection method, both $\tilde{r}_\mu^a$ and $\tilde{r}_\mu^b$ contain useful information for user μ. The natural approach is to demodulate the signals from two transmitters separately and then combine the estimates. When estimating $\tilde{r}_\mu^a$, block equalizer 18 treats $\tilde{r}_\mu^b$ as inter-cell interference, according the previously detailed design. Similarly, when estimating $\tilde{r}_\mu^b$, block equalizer 23 treats $\tilde{r}_\mu^a$ as inter-cell interference. Consequently, two separate symbol estimates become available in accordance with equations (26) and (27).

$$\tilde{s}_\mu^a = \frac{1}{A_\mu^a}(\overline{H}_\mu^a)^H \tilde{r}_\mu^a \quad (26)$$

$$\tilde{s}_\mu^b = \frac{1}{A_\mu^b}(\overline{H}_\mu^b)^H \tilde{r}_\mu^b \quad (27)$$

In general, $A_\mu^a \neq A_\mu^b$, depending on the power controlled by each transmitter. For each symbol $s_{\mu,k}$, equation (28) is obtained from the equivalent model given in previously in equation (23). The noise variables $n_{\mu,k}^a$ and $n_{\mu,k}^b$ are approximately uncorrelated because the scrambling codes of the two transmitters are random and uncorrelated. The final symbol estimate is obtained in accordance with equation (29) where the optimal weights $\lambda^a$ and $\lambda^b$ are determined through minimizing the MSE $E\{|\hat{s}_{\mu,k} - s_{\mu,k}|^2\}$.

$$\begin{bmatrix} \hat{s}_{\mu,k}^a \\ \hat{s}_{\mu,k}^b \end{bmatrix} = \begin{bmatrix} \alpha_{\mu,k}^a \\ \alpha_{\mu,k}^b \end{bmatrix} s_{\mu,k} + \begin{bmatrix} n_{\mu,k}^a \\ n_{\mu,k}^b \end{bmatrix} \quad (28)$$

$$\hat{s}_{\mu,k} = \lambda^a \hat{s}_{\mu,k}^a + \lambda^b \hat{s}_{\mu,k}^b \quad (29)$$

By applying the block MMSE formula given in equation (13) to equation (28), the optimal weights are given in accordance with equation (30). The post combining SINR can be easily verified to be given as equation (31).

$$\begin{bmatrix} \lambda^a \\ \lambda^b \end{bmatrix} = \frac{1}{\frac{(A_\mu^a)^2 \alpha^a}{\sigma_{z,a}^2(1-\alpha^a)} + \frac{(A_\mu^b)^2 \alpha^b}{\sigma_{z,b}^2(1-\alpha^b)} + \frac{1}{\sigma_s^2}} \begin{bmatrix} \frac{(A_\mu^a)^2 \alpha^a}{\sigma_{z,a}^2(1-\alpha^a)} \\ \frac{(A_\mu^b)^2 \alpha^b}{\sigma_{z,b}^2(1-\alpha^b)} \end{bmatrix} \quad (30)$$

$$SINR_\mu^{soft} = \frac{(A_\mu^a)^2 \alpha^a \sigma_s^2}{\sigma_{z,a}^2(1-\alpha^a)} + \frac{(A_\mu^b)^2 \alpha^b \sigma_s^2}{\sigma_{z,b}^2(1-\alpha^b)} = SINR_\mu^a + SINR_\mu^b \quad (31)$$

Equation (31) reveals the benefit of soft handoff and equation (32) shows the relation between soft handoff and hard handoff operation. The post combining SINR is enhanced by summing the individual SINRs corresponding to two separate transmitters. Because $H^a$ and $H^b$ are independent, the diversity available through the two transmitters is collected. In contrast, a mobile in a hard handoff mode only switches to the transmitter with better reception quality.

$$SINR_\mu^{soft} > SINR_\mu^{hard} := \max\{SINR_\mu^a, SINR_\mu^b\} \quad (32)$$

When two transmitters have approximately identical reception quality, i.e. $SINR_\mu^a \approx SINR_\mu^b$, soft hand off offers a 3 dB SINR gain over hard handoff. Additionally soft handoff prevents the mobile from frequent switching between two transmitters in such situations.

Instead of the previously described two-step approach, it is particularly advantageous to perform one-step detection in receiver 6. Specifically, for transmitter B, equation (7) can be rewritten in accordance with equation (33) where $\tilde{s}_I^a$, defined similar to $\tilde{s}_I^b$, represents the inter-cell interference from transmitter A. Blocks $\tilde{r}_\mu^a$ and $\tilde{r}_\mu^b$ are formed by collecting the outputs from M subchannels. The blocks are concatenated to construct a single block $\tilde{r}_\mu$ and block equalization is performed once. Specifically, suppose there are two receivers, i.e. M=2, and the blocks $\tilde{r}_{\mu,m}^a, \tilde{r}_{\mu,m}^b$ from two different channels are stacked in accordance with equation (34).

$$\tilde{r}_{\mu,m}^b := (\tilde{D}_\mu^b)^H \tilde{y}_m = A_\mu^b \overline{H}_m^b \tilde{s}_\mu + \overline{H}_m^a \tilde{s}_I^a + (\tilde{D}_\mu^b)^H \tilde{w}_m \quad (33)$$

$$r_\mu := \begin{bmatrix} \tilde{r}_{\mu,1}^a \\ \tilde{r}_{\mu,2}^a \\ \tilde{r}_{\mu,1}^b \\ \tilde{r}_{\mu,2}^b \end{bmatrix} = \begin{bmatrix} A_\mu^a \overline{H}_1^a & \overline{H}_1^b & 0 \\ A_\mu^a \overline{H}_2^a & \overline{H}_2^b & 0 \\ A_\mu^b \overline{H}_1^b & 0 & \overline{H}_1^a \\ A_\mu^b \overline{H}_2^b & 0 & \overline{H}_2^a \end{bmatrix} \begin{bmatrix} \tilde{s}_\mu \\ \tilde{s}_I^b \\ \tilde{s}_I^a \end{bmatrix} + \begin{bmatrix} (\tilde{D}_\mu^{a^H} \tilde{w}_1) \\ (\tilde{D}_\mu^{a^H} \tilde{w}_2) \\ (\tilde{D}_\mu^{b^H} \tilde{w}_1) \\ (\tilde{D}_\mu^{b^H} \tilde{w}_2) \end{bmatrix} \quad (34)$$

If the noise vectors $\tilde{w}_1$ and $\tilde{w}_2$ are independent and white Gaussian, the processed additive noise is still white Gaussian, provided that the scrambling codes from different cells are uncorrelated as given in equation (35).

$$E\{(\tilde{D}_\mu^a)^H \tilde{D}_\mu^b\} = E\{(\mathbf{A}^a c_\mu^a)^H (\mathbf{A}^b c_\mu^b)\} I_{K+L} = 0 \quad (35)$$

In this case, equation (34) can be rewritten in accordance with equation (36).

$$r_\mu = \begin{bmatrix} A_\mu^a \overline{H}^a \\ A_\mu^b \overline{H}^b \end{bmatrix} s_\mu + \begin{bmatrix} \overline{H}^b \hat{s}_I^b \\ \overline{H}^a \hat{s}_I^a \end{bmatrix} + AWGN \quad (36)$$

Based on the similarity of equation (36) with equation (10), the block equalizers provided in equations (12) and (13) can be applied. The correlation between $\tilde{s}_I^a$ and $\tilde{s}_I^b$ is on the order of $O(1/P_{CIBS})$, and is, therefore, negligible. The correlation matrix accounting for the interference-plus-noise is given according to equation (37) where $R_\eta^a$ and $R_\eta^b$ correspond to the correlation matrices in the previously described two-step approach. As a result, the inverse of $R_\eta$ can be performed in a block diagonal fashion, i.e. $R_\eta^{-1} = \text{diag}((R_\eta^a)^{-1}, (R_\eta^b)^{-1})$, with each block matrix inversion expressed as in equation (20). Consequently, the matrix inversion is of size K, and no complexity increase occurs relative to the previously described two-step approach.

$$R_\eta = \text{diag}(R_\eta^a, R_\eta^b) \quad (37)$$

The one-step approach performs better than the two-step approach. It is important to note that in the one-step approach, equation (36) is an over-determined system with 2M(K+L) equations and 3K unknowns in the absence of noise. In contrast, for the two-step approach, individual block equalization is based on M(K+L) equations containing 2K unknowns.

The analysis above described joint combining based on block equalizers. However, joint combining using serial equalizers is also possible and operates equivalently on 2M subchannels as in equation (36). Soft handoff doubles the number of equivalent subchannels in CIBS-CDMA by exploiting the transmitter induced diversity.

It is important to note that the one-step approach is not possible for DS-CDMA because the two chip sequences in DS-CDMA are different even though they include the same symbol information for the soft handoff user. However, CIBS-CDMA is not able to afford as high of a maximum intra-cell user load as DS-CDMA as a result of MUI free reception within each cell due to the redundancy introduced by guard intervals. For each frame of fixed length $N_f$, $N_f = K_f P_{DS} + N_{guard} = N_{sb}(K_f/N_{sb}+L)P_{CIBS}$. As a result, equation (38) provides a relationship between the number of chips in a frame for DS-CDMA and CIBS-CDMA.

$$P_{ds} \approx \left(1 + N_{sb}\frac{L}{K_f}\right)P_{cibs} = \left(1 + \frac{L}{K}\right)P_{cibs}\rangle P_{cibs} \quad (38)$$

The maximum achievable intra-cell user load is given by the spreading-code length. The fact that $P_{DS} > P_{CIBS}$ indicates that DS-CDMA can afford a higher maximum intra-cell user load than CIBS-CDMA. However, when L is small or moderate, one can choose K>>L, so that $P_{DS} \approx P_{CIBS}$ and both systems can afford approximately the same maximum intra-cell user load. Additionally, it is important to note that the performance of CIBS-CDMA does not depend on the intra-cell user load U, which can change arbitrarily between 1 and $P_{CIBS}$. This provides particular advantage over DS-CDMA which degrades in performance as the number of active users increases since the MMSE chip equalizer cannot suppress MUI substantially.

In comparison to a DS-CDMA receiver CIBS-CDMA receiver 6 may provide particular advantages in complexity and flexibility. The receivers involve three kinds of operations: equalizer design, channel equalization, and de-spreading. The complexities for both DS-CDMA and CIBS-CDMA systems using one multiply-add operation as a unit are given below in Table 1 and Table 2, respectively.

TABLE 1

| DS-CDMA | Chip Equalizer (complexity per symbol) |
|---|---|
| Equalizer Design | $2O((L + L_g + 1)^3)/K_f$ |
| Equalization | $2O((L + L_g + 1)^3)/K_f$ |
| De-spreading | $2O((L + L_g + 1)^3)/K_f$ |

TABLE 2

| CIBS-CDMA | Block Equalizer | Serial Equalizer |
|---|---|---|
| Equalizer Design | $2O(K^3)/K_f$ | $2O((L + L_g + 1)^3)/K_f$ |
| Equalization | $M(K + L)$ | $M(L_g + 1)$ |
| De-spreading | $MP_{cibs}(1 + L/K)$ | $MP_{cibs}(1 + L/K)$ |

The complexities of the equalizer designs in Table 1 and Table 2 were computed based on direct matrix inversion for a MMSE equalizer in a DS-CDMA and a CIBS-CDMA system. Low complexity equalizer implantations are possible, e.g. by exploiting the Toeplitz structure of the convolutional channel matrix. For simplicity, these alternatives are not considered herein.

The complexity of equalizer design for the DS-CDMA chip equalizer is a cubic function of $(L+L_g+1)$ whereas the complexity of the block equalizer design for CIBS-CDMA is of K. The relative complexity, therefore, depends on the relative value of $(L+L_g+1)$ compared with K. Assuming $L_g=L$ for the chip equalizer and setting $K=(L+L_g+1)=2L+1$ results in both systems having identical complexities in constructing the respective equalizer. In this particular case equation (39) is satisfied.

$$P_{cibs} = \frac{K}{K+L}P_{ds} \approx \frac{2}{3}P_{ds} \quad (39)$$

Consequently, CIBS-CDMA can afford lower complexity than DS-CDMA if the maximum load $P_{CIBS} < (2/3)P_{DS}$ and can have higher complexity if $P_{CIBS} > (2/3)P_{DS}$. These complexities decrease quickly as the channel length decreases.

The complexity plus de-spreading for DS-CDMA and CIBS-CDMA is given in equations (40) and (41) respectively. Because $P_{DS}L > K+L+P_{DS}$ in practical setups, DS-CDMA requires higher complexity for equalization plus de-spreading than CIBS-CDMA. The main reason is that DS-CDMA needs to restore the entire chip sequence, which is $P_{DS}$ times longer than the symbol sequence for the desired user. If serial equalizers with identical design complexities are deployed in both systems, it is clear that the receiver complexity in CIBS-CDMA is less than that in DS-CDMA.

$$M \cdot P_{DS}(L_g + 1) + P_{DS} > M \cdot P_{DS} \cdot L \quad (40)$$

$$M \cdot (K+L) + M \cdot P_{CIBS}\left(1 + \frac{L}{K}\right) \approx M(K+L+P_{DS}) \quad (41)$$

CIBS-CDMA has further equalizer options in addition to linear block and serial equalizers. Two important non-linear receivers that improve performance considerably by capitalizing on the finite-alphabet property of source symbols are the block DFE equalizer and the PDA method. The PDA detector achieves a performance close to that of an optimal maximum likelihood (ML) detector. Both DFE and PDA receivers entail only cubic complexity $O(K^3)$ per symbol block, and are thus suitable for CIBS-CDMA systems with moderate block size K. In contrast, for DS-CDMA receivers with chip equalization, only linear equalizers are feasible. Due to the lack of decoded symbols from other users, DFE and PDA receivers are not applicable in the DS-CDMA downlink operation.

Because the intra-cell users are completely decoupled in CIBS-CDMA, increasing the transmit power of a particular user will not affect the performance of other users. Consequently, power control can be used effectively in CIBS-CDMA. Power control has been proven useful in cellular applications and is standardized in, e.g. IS-95. Mobile users are often uniformly distributed within each cell. Depending on the user's distance from the transmitter, far away users experience much greater power attenuation than nearby users. In order to balance the performance and lower the total transmission power, the transmitter may increase the transmission power to far away users, and decrease transmission power towards nearby users. Optimal power allocation is done on a per user basis and is, therefore, less complicated than optimal power allocation for DS-CDMA which needs to consider all users simultaneously.

Figure 3:
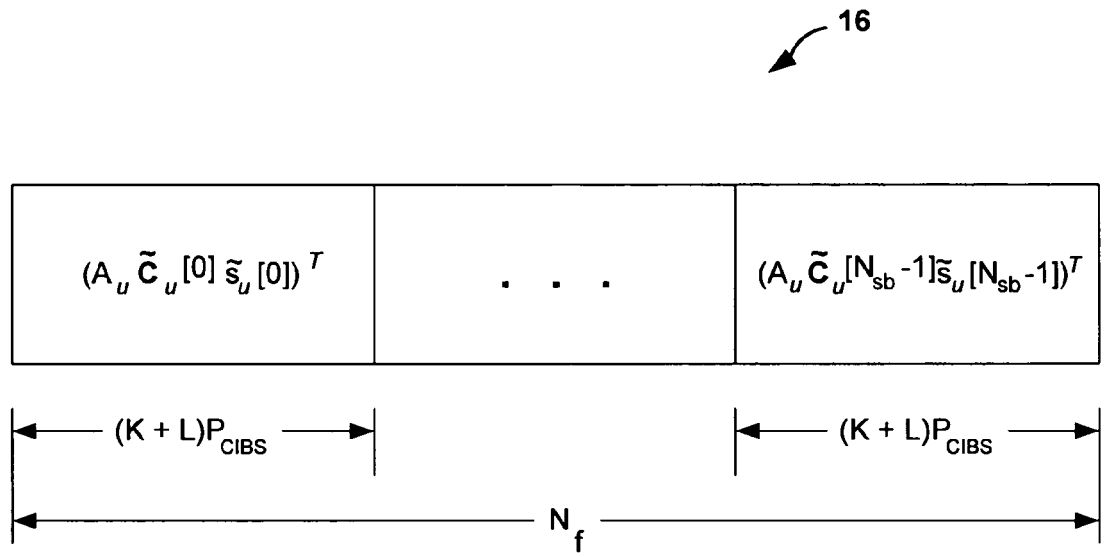
FIG. 3 illustrates an example frame of a data stream generated by a block-spreading unit within the transmitter of FIG. 2.

FIG. 3 illustrates in more detail chip block $x_u$ 16 generated by block spreading unit 13 (FIG. 2). Transmitter 4 transmits chip block $$x_u = \{A_u \tilde{C}_u[i] \tilde{s}_u[i]\}_{i=0}^{N_{sb}-1}$$

16 where the weight $A_u$ controls the $u^{th}$ user's transmit-power and block spreading unit 13 applies the tall $N_f \times K_f$ spreading matrix $\mathcal{C}_u[i]$ of user u to each of the $N_{sb}$ sub-blocks $\tilde{s}_u[i]$ 12. Spreading matrix $\mathcal{C}_u[i]$ is designed in accordance with equation (1) and spreads each sub-block into $(K+L)P_{CIBS}$ interleaved chips with each frame containing $N_f = N_{sb}(K+L)P_{CIBS}$ chips. Consequently, transmitter 4 transmits $N_f$ chips for the $K_f$ symbols within a frame.

Figure 4:
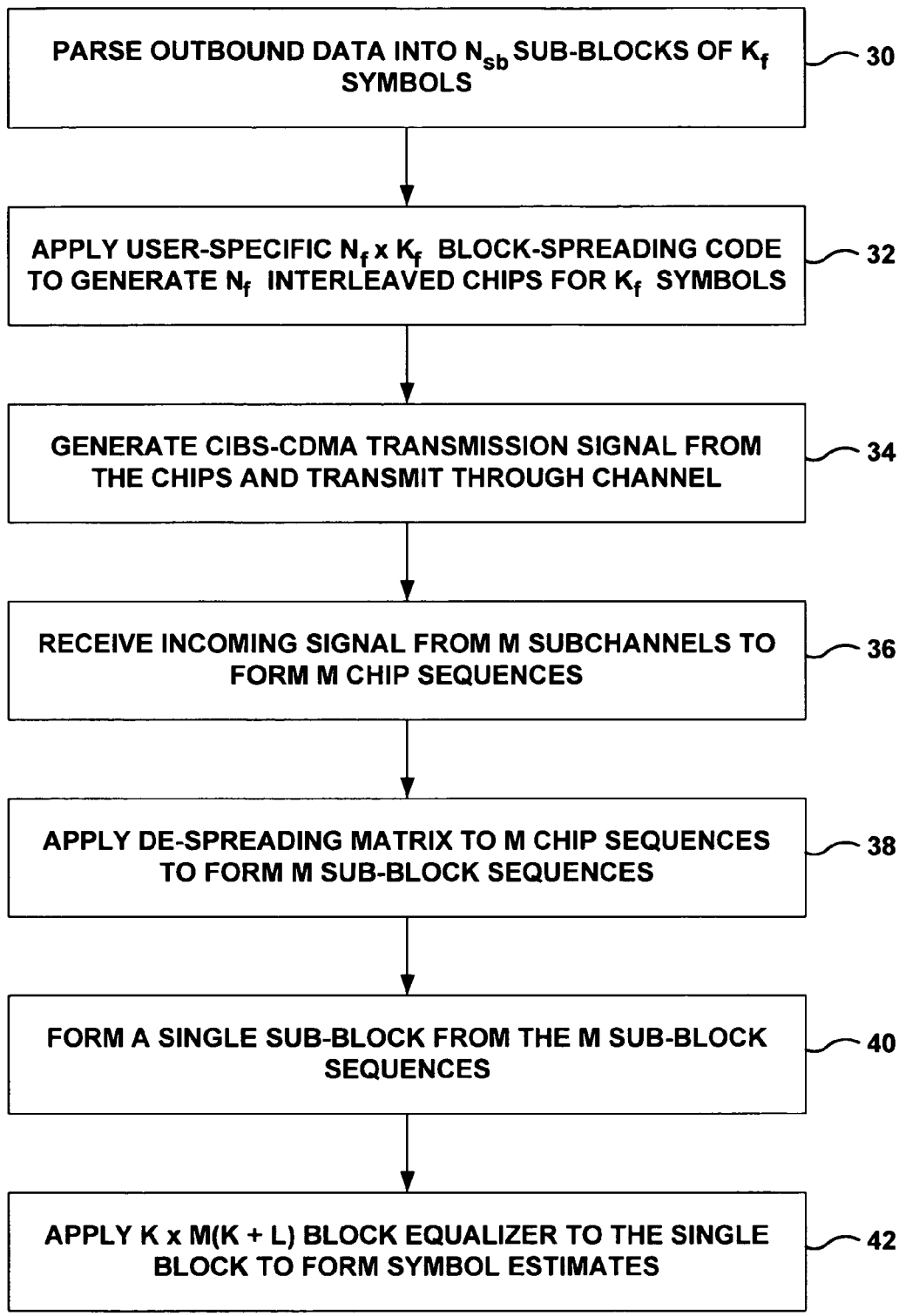
FIG. 4 is a flowchart illustrating an example mode of operation of the communication system of FIG. 2 in which a receiver performs one-step block equalization on a CIBS-CDMA signal.

FIG. 4 is a flowchart illustrating an example mode of operation of communication system 2 of FIG. 2 in which receiver 6 performs a "one-step" block equalization process to produce symbol estimates from CIBS-CDMA signal transmitted by transmitter 4 through channel 8. Generally, transmitter 4 parses an outbound serial data stream into $N_{sb}$ sub-blocks of $K_f$ symbols (step 30) and applies a user-specific $N_f \times K_f$ block-spreading code $\mathcal{C}_u[i]$ to generate $N_f$ interleaved chips for $K_f$ symbols (step 32). After block-spreading, the chips that are generated from the same symbol are temporally spaced and separated by guard chips. In this manner, each frame of $K_f$ symbols produces $N_f = N_{sb}(K+L)P_{CIBS}$ chips, where L represents the number of guard chips and $P_{CIBS}$ represents the length of the orthonormal CIBS-CDMA signature code $c_u$. Transmitter 4 generates a CIBS-CDMA signal from the interleaved chips and transmits the signal through communication channel 8 (step 34).

Receiver 6 receives the CIBS-CDMA signal from M sub-channels and forms M chip sequences (step 36). Multi-channel reception is available at receiver 6. For example, multiple receive antennas can be deployed at receiver 6 to boost system performance. However, due to size limitations, a receiver can typically deploy up to two $M_r=2$ receive antennas. Alternatively, multi-channel reception becomes available by sampling the received signal at rate $M_s/T_c$, where $M_s$ represents the oversampling factor. Both multi-antenna reception and oversampling generally create multiple channels. In some embodiments, each receive antenna is oversampled by $M_s$ creating a system with $M=M_r M_s$ effective channels.

Receiver 6 then applies de-spreading matrix $\mathcal{D}_u[i]$ to the M chip sequences (step 38) to form M sub-block sequences $\tilde{r}_{u,m}$ and separate the sub-blocks for the multiple users based on orthogonality. Receiver 4 then performs a one-step block equalization process to remove the channel effects and produce symbol estimates from single sub-blocks. The one-step block equalization process forms a single block $\tilde{r}_u$ from the sub-block sequences (step 40) in accordance with equation (4) and applies the $K \times M(K+L)$ block equalizer to the single block (step 42). The block equalizer can be a linear equalizer, a non-linear equalizer, or a serial equalizer as described previously.

FIGS. 5-14 are graphs that present simulations of CIBS-CDMA with the described block equalization techniques in downlink operation and simulations of DS-CDMA with chip equalization in downlink operation for the purpose of comparison. In all simulations, transmissions are made with a chip rate of $1/T_c=3.84$ MHz, as specified in 3G systems. The typical (Tux) channel model which consists of 20 discrete delays over $\tau_{s,max}=2.14$ µs is used and the power of each path decreases as the delay increases. The last 20 paths only occupy 8.8 percent of the total power for 20 paths. The delays and powers of the first 10 taps can also be found in Table 2 of L. Mailaender, "Low Complexity Implementation of CDMA Downlink Equalization," in Proceedings of 3G 2001 Conference, UK, Mar. 26, 2001. For the transmit and receive filters, a root raised cosine filter with roll-off factor $\alpha=0.22$ is used. The linear convolution of transmit and receive filters yields a raised cosine filter, which is truncated to have non-zero support of $T_{support}=9T_c$. Additionally, $\tau_{margin}=2.8$ µs. If inter-cell interference is strong enough to be considered, the signals from the interfering base station arrive with an arbitrary delay drawn from $[0, \tau_{margin}]$, relative to that from the desired base station. This $\tau_{margin}$ allows the interfering signals from different base station to differ up to 0.85 km when reaching the desired mobile. Correspondingly, $L=\lceil(\tau_{s,max}+\tau_{margin}+T_{support})/T_c\rceil=28$.

The frame interval $T_f=10/15=2/3$ ms is set corresponding to one time slot in the UTRA TDD mode so that each frame contains $T_f/T_c=2,560$ chips. For convenience, the last 6 chips per frame are set equal to zero and take $N_f=2,544$. For DS-CDMA the spreading gain $P_{DS}=16$ and a guard interval of length $N_{guard}=28$ is used. In each frame, $K_f=156$ symbols are transmitted per user so that $N_f = K_f P_{DS} + N_{guard}$. Correspondingly, for CIBS-CDMA, $P_{CIBS}=12$ and $N_{sb}=2$, and $K=K_f/N_{sb}$ 78. Length 16 and length 12 Walsh Hadamard codes are deployed as user codes in DS-CDMA and DIBS-CDMA, respectively. Walsh Hamard codes with length N exist only when N/4 is an integer. Complex quadrature phase shift keying (QPSK) sequences with unit amplitude are used as scrambling codes for both systems. Each user in both DS-CDMA and CIBS-CDMA systems achieve a data rate of 234 kilo symbols per second (ksps) since 156 symbols are transmitter per 2/3 ms. However, due to the efficiency loss incurred by the guard interval, the maximum possible number of users in CIBS-CDMA is 12, which is 4 less than that of DS-CDMA. The fewer number of possible users is the price paid by CIBS-CDMA for MUI free reception.

The simulation results are plotted using two different formats. The first format fixes the number of users and evaluates performance by varying the noise power. For DS-CDMA, two typical user number are chosen: U=6 for a medium system load and U=12 for a high system load. While in CIBS-CDMA each user's performance is not affected by the system load, and thus U can take an arbitrary value in $\{1, \ldots, 12\}$. The second format fixes the noise power and compares CIBS-CDMA and DS-CDMA by changing the number of users. In all simulations, BPSK signaling is used and the signal-to-noise ratio (SNR) is defined as $SNR:=\sigma_s^2/\sigma_w^2$. The transmit power $A_u$ is defined $A_u=1, \forall u \in \{1, \ldots, U\}$ except for the power control test scenario illustrated in FIG. 13 and FIG. 14. Simulation results for all FIGS. are averaged over 1,000 channels.

Figure 5:
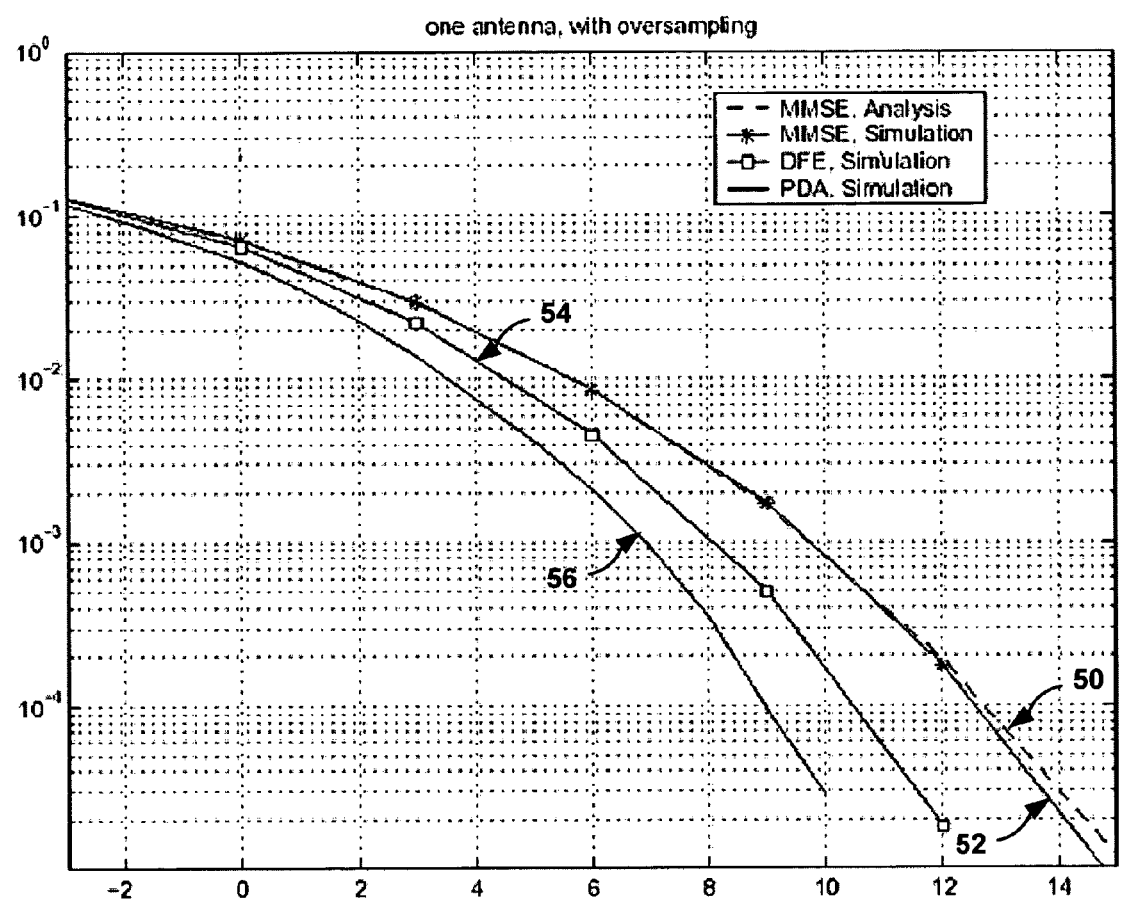
FIGS. 5-14 are graphs illustrating performance estimates of the block equalization techniques described herein.

FIG. 5 is a graph comparing the MMSE analysis 50 to simulations of MMSE 52, DFE 54, and PDA 56 receivers for CIBS-CDMA systems in downlink operation with one antenna and oversampling. Specifically, MMSE analysis 50 verifies equations (22) and (24) for CIBS-CDMA with block MMSE equalizers. However, simulations 52, 54, and 56 illustrate that non-linear PDA and DFE receivers perform significantly better than the linear MMSE equalizer. Keeping this fact in mind, the following FIGS. compare the performance of CIBS-CDMA against DS-CDMA, primarily using MMSE block equalizers.

Figure 6:
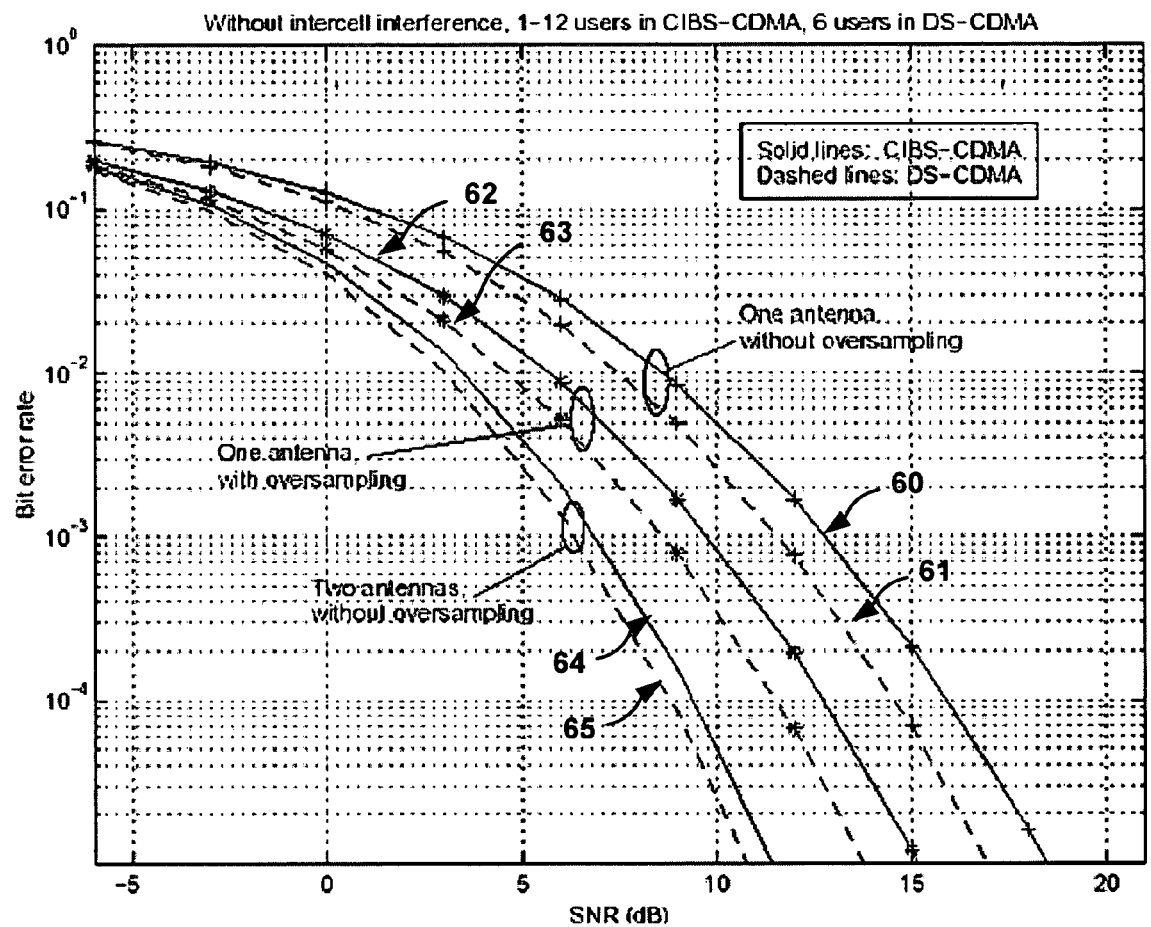
Figure 7:
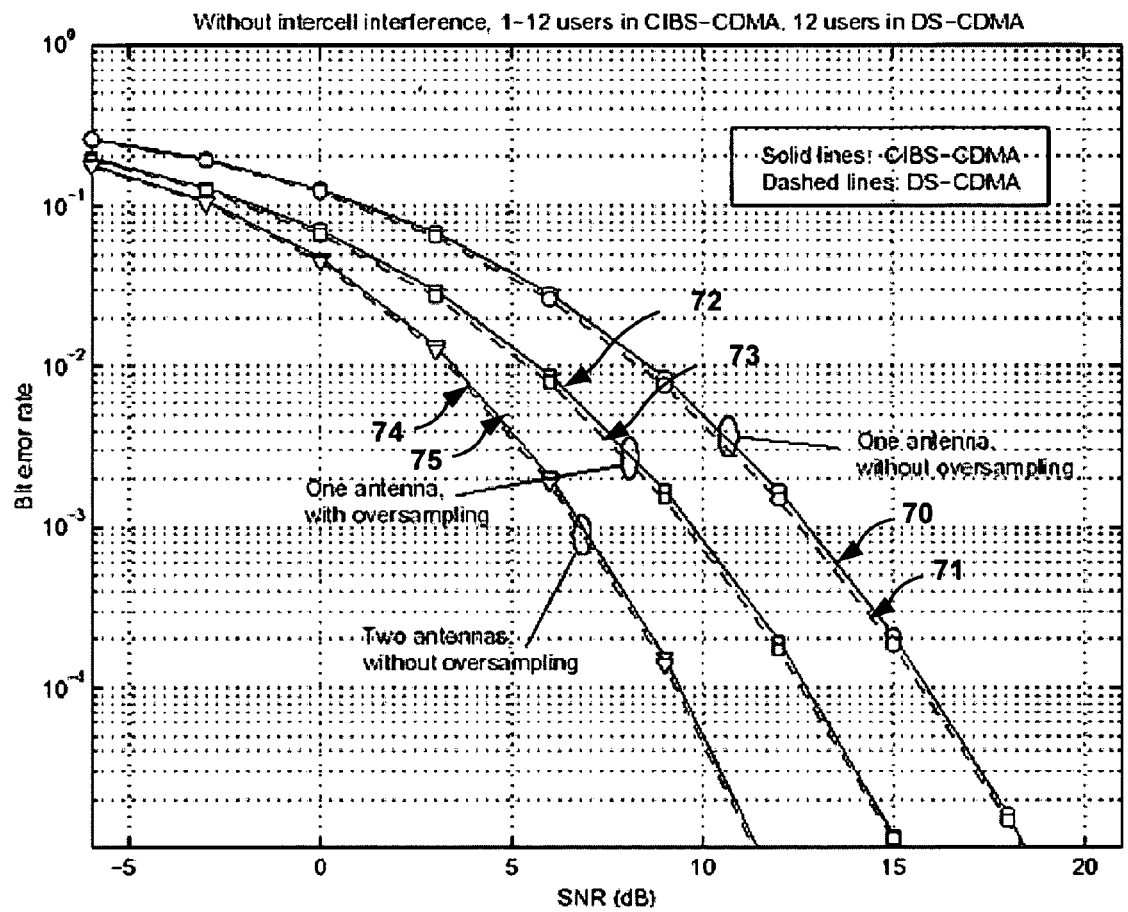

FIGS. 6 and 7 are graphs comparing CIBS-CDMA against DS-CDMA under varying system loads and without inter-cell interference. Specifically, FIG. 6 compares a CIBS-CDMA system with 1-12 users and a MMSE block equalizer against a DS-CDMA system with 6 users and a MMSE chip equalizer while FIG. 7 compares a CIBS-CDMA system with 1-12 users and a MMSE block equalizer against a DS-CDMA system with 12 users and a MMSE chip equalizer. Simulations comparing CIBS-CDMA against DS-CDMA are made for systems with one antenna and without oversampling in FIG. 6 (60, 61) and FIG. 7 (70, 71), respectively. Similarly, simulation comparing CIBS-CDMA against DS-CDMA are made for systems with one antenna and with oversampling in FIG. 6 (62, 63) and FIG. 7 (72, 73), respectively. Simulations comparing CIBS-CDMA against DS-CDMA are also made for systems with two antennas and without oversampling in FIG. 6 (64, 65) and FIG. 7 (74, 75), respectively. With the MMSE linear receivers, DS-CDMA performs better than CIBS-CDMA with medium loads as illustrated in FIG. 6. However, both systems have comparable performance with high loads in FIG. 7. Oversampling ($M_r=1$, $M_s=2$) yields correlated channels and the performance is significantly worse than that with two receive antennas ($M_r=2$, $M_s=1$).

Figure 8:
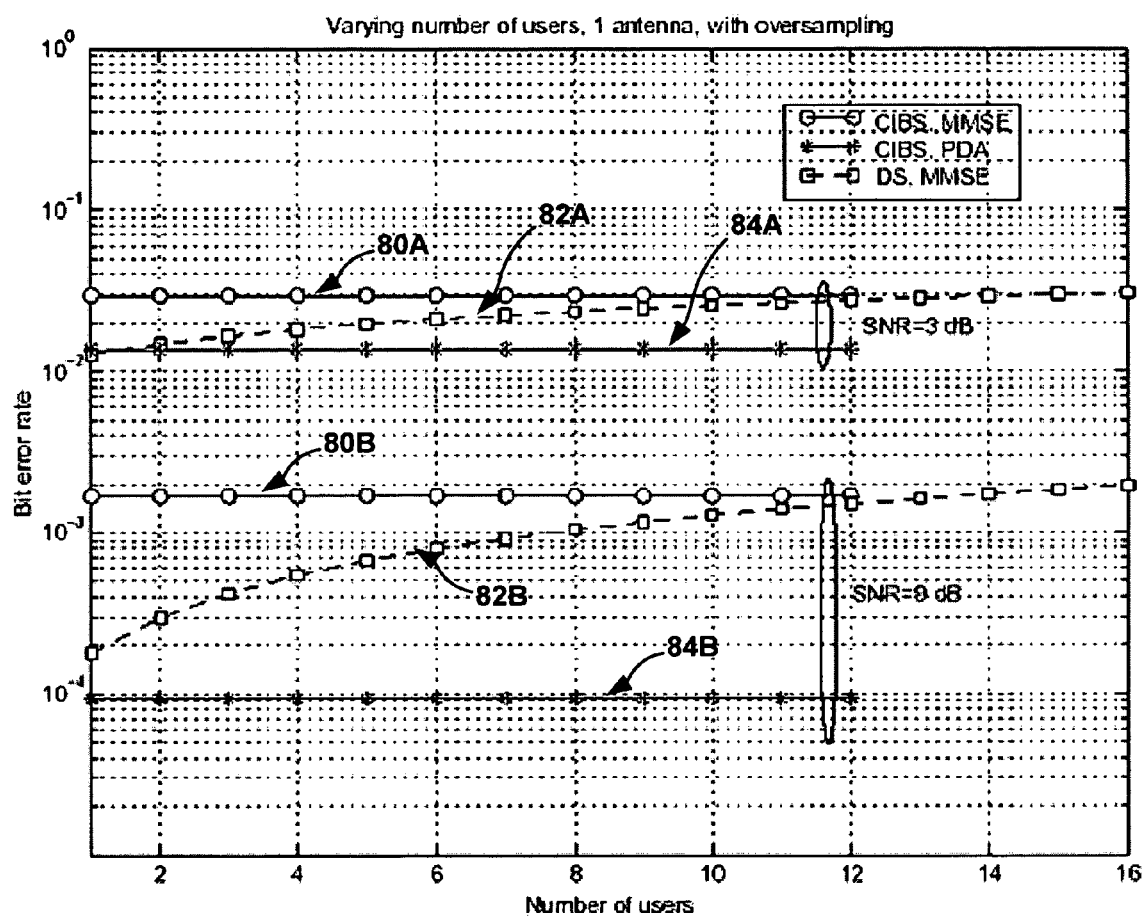

FIG. 8 is a graph comparing the BER performance with a varying number of users at SNR=3 dB and SNR=9 dB for a CIBS-CDMA system with a MMSE block equalizer (80A and 80B, respectively), a CIBS-CDMA system with a PDA block equalizer (82A and 82B, respectively), and a DS-CDMA system with a MMSE block equalizer (84A and 84B, respectively). At both system loads, DS-CDMA (82A) and (82B) outperforms CIBS-CDMA with linear receivers (80A) and (80B) but does not perform as well as CIBS-CDMA with non-linear PDA receivers (84A) and (84B). The cubic complexity $O(K^3)$ of the PDA receiver makes it an attractive choice for CIBS-CDMA.

Figure 9:
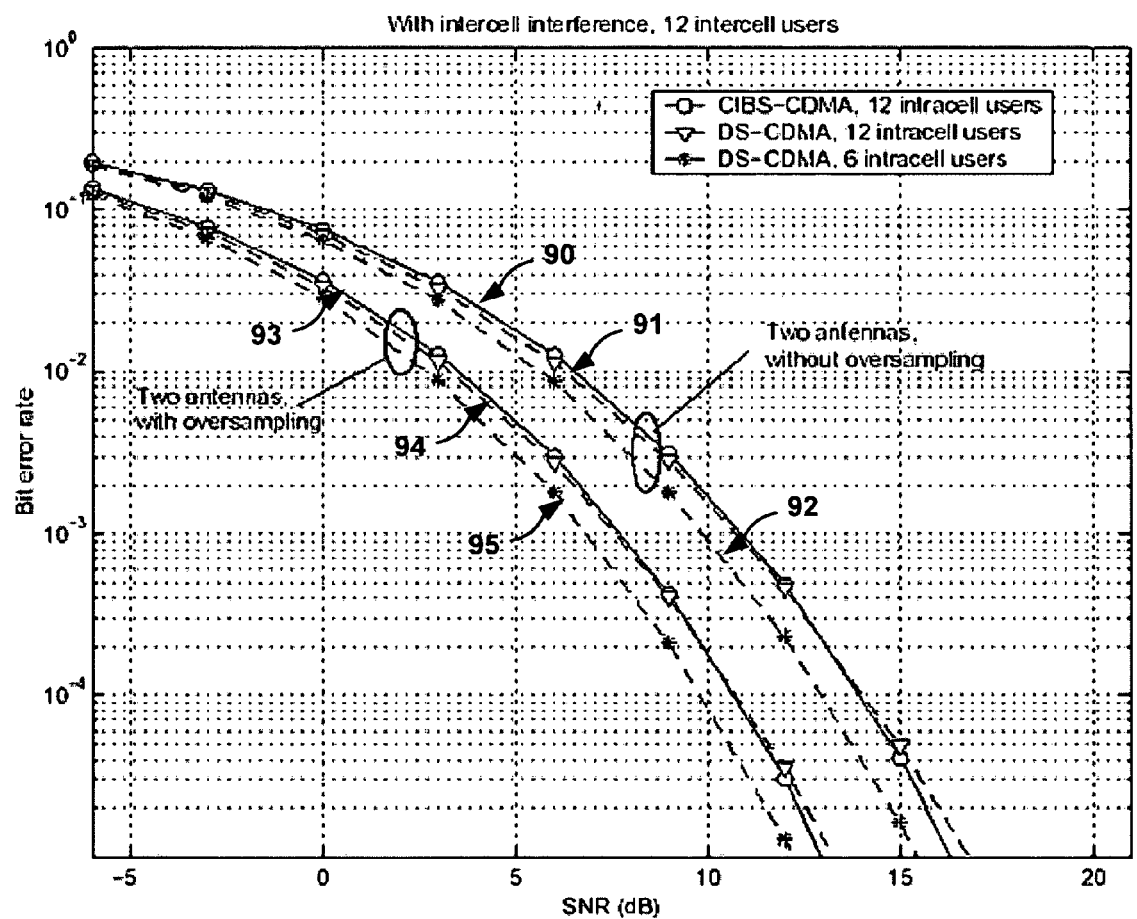

FIG. 9 is a graph comparing CIBS-CDMA against DS-CDMA under varying system loads in the presence of inter-cell interference. The channels corresponding to the interfering base stations are simulated to have the same average power as those of the desired base station. Specifically, a CIBS-CDMA system with linear MMSE receivers and 12 intra-cell users is simulated with two antennas and without oversampling 90 and with two antennas and with oversampling 93. Similarly, a DS-CDMA system with linear receivers and 12 intra-cell users is simulated with two antennas and without oversampling 91 and with two antennas and with oversampling 94. A DS-CDMA system with linear receivers and 6 intra-cell users is also simulated with two antennas and without oversampling 93 and with two antennas and with oversampling 95. The results are similar to the results of FIG. 6 and FIG. 7 with CIBS-CDMA performing substantially equal to DS-CDMA with 12 users when inter-cell interference is present.

Figure 10:
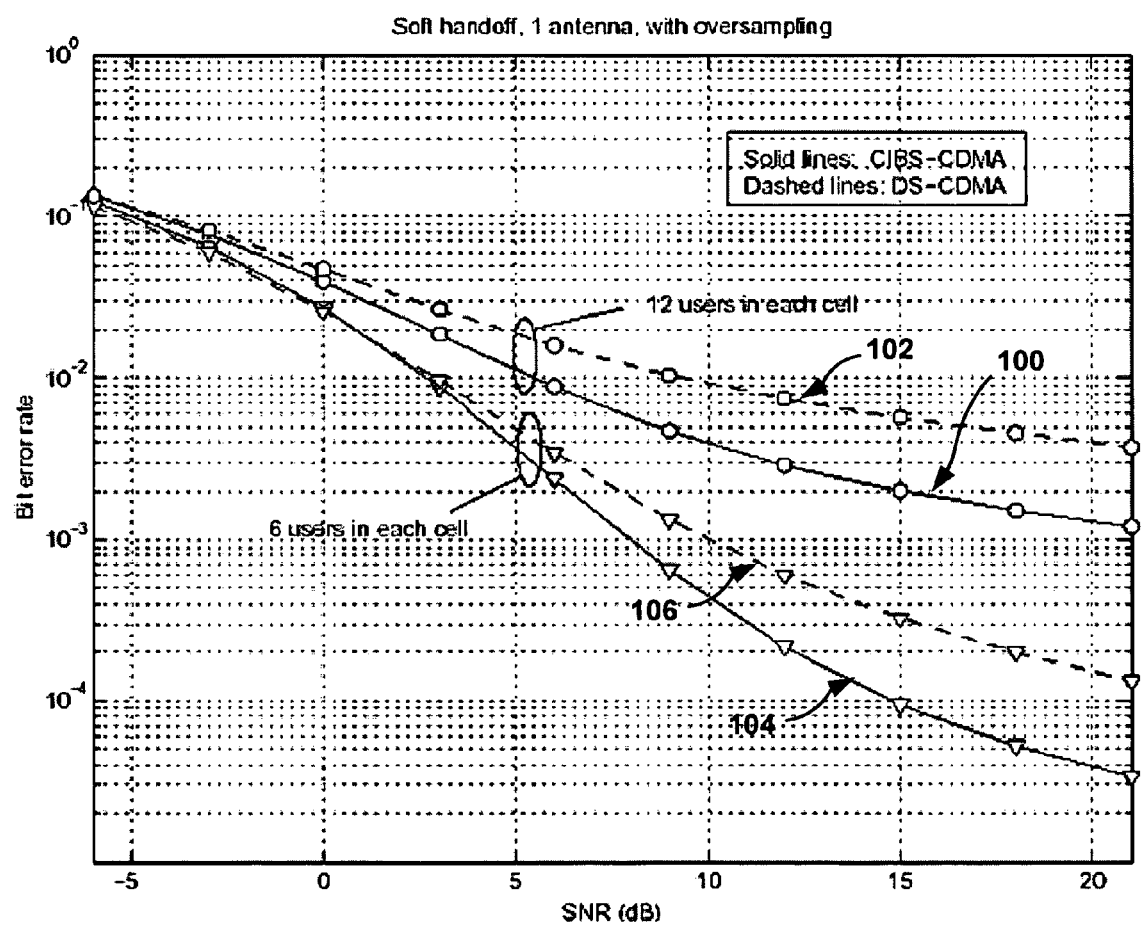

FIG. 10 is a graph comparing a one antenna CIBS-CDMA system with oversampling against a one antenna DS-CDMA system with oversampling when the desired user is located on the edge of two cells and soft handoff operation is invoked. Specifically, FIG. 10 compares CIBS-CDMA with 12 users in each cell against DS-CDMA with 12 users in each cell, 100 and 102, respectively. Similarly, FIG. 10 also compares CIBS-CDMA with 6 users in each cell against DS-CDMA with 6 users in each cell, 104 and 106, respectively. Because the number of active users in one cell determines the interference power to the other cell, the performance of both systems under soft handoff operation depends on the number of active users in both cells. The number of users is set $U^a=U^b$ and linear receivers are used for both systems. Because of the one-step approach, FIG. 10 explicitly shows a clear performance advantage of the CIBS-CDMA system over the DS-CDMA system for 12 users in each cell and 6 users in each cell.

Figure 11:
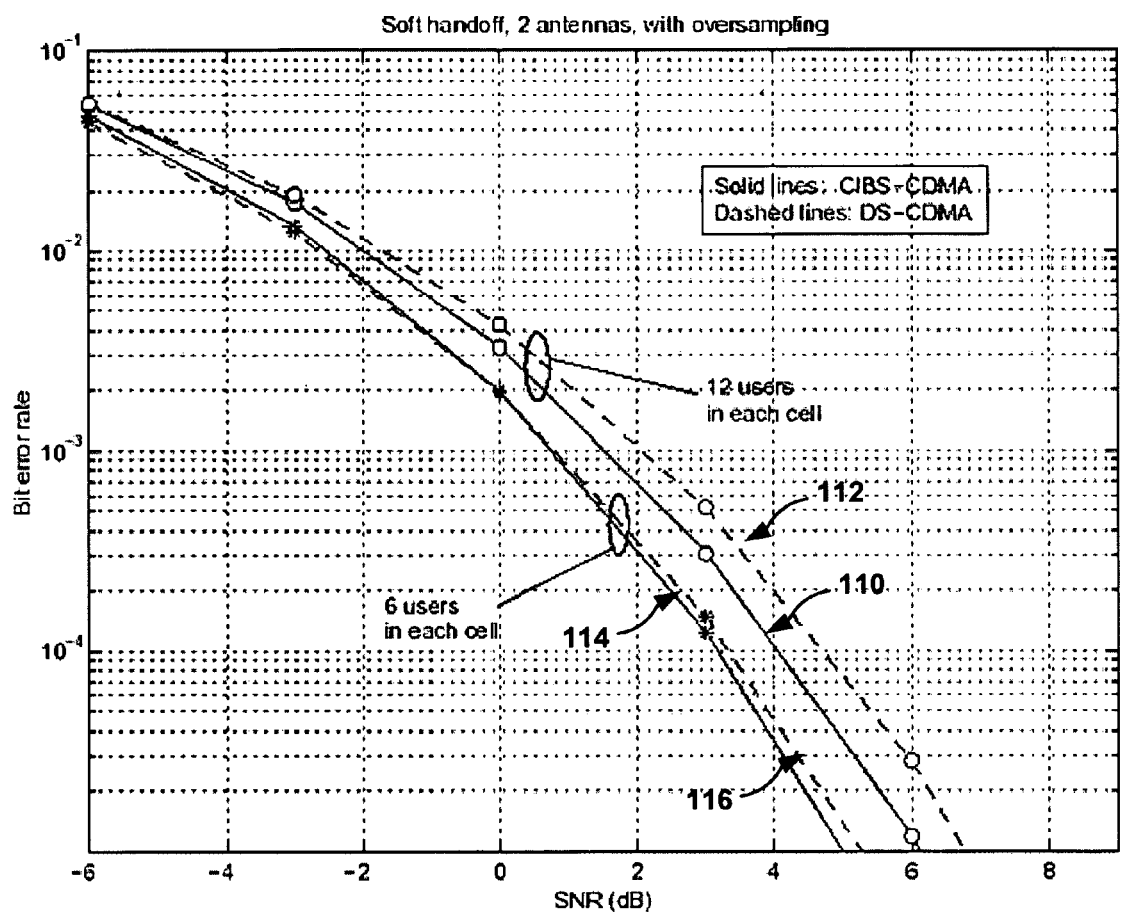

FIG. 11, correspondingly, is a graph comparing a two antenna CIBS-CDMA system with oversampling against a two antenna DS-CDMA system when the desired user is located on the edge of two cells and soft handoff operation is invoked. Specifically, FIG. 11 compares CIBS-CDMA with 12 users in each cell against DS-CDMA with 12 users in each cell, 110 and 112, respectively. Similarly, FIG. 11 also compares CIBS-CDMA with 6 users in each cell against DS-CDMA with 6 users in each cell, 114 and 116, respectively. While CIBS-CDMA still performs better than DS-CDMA for both 12 users in each cell and 6 users in each cell, the advantage is decreased because of the two antenna configuration.

Figure 12:
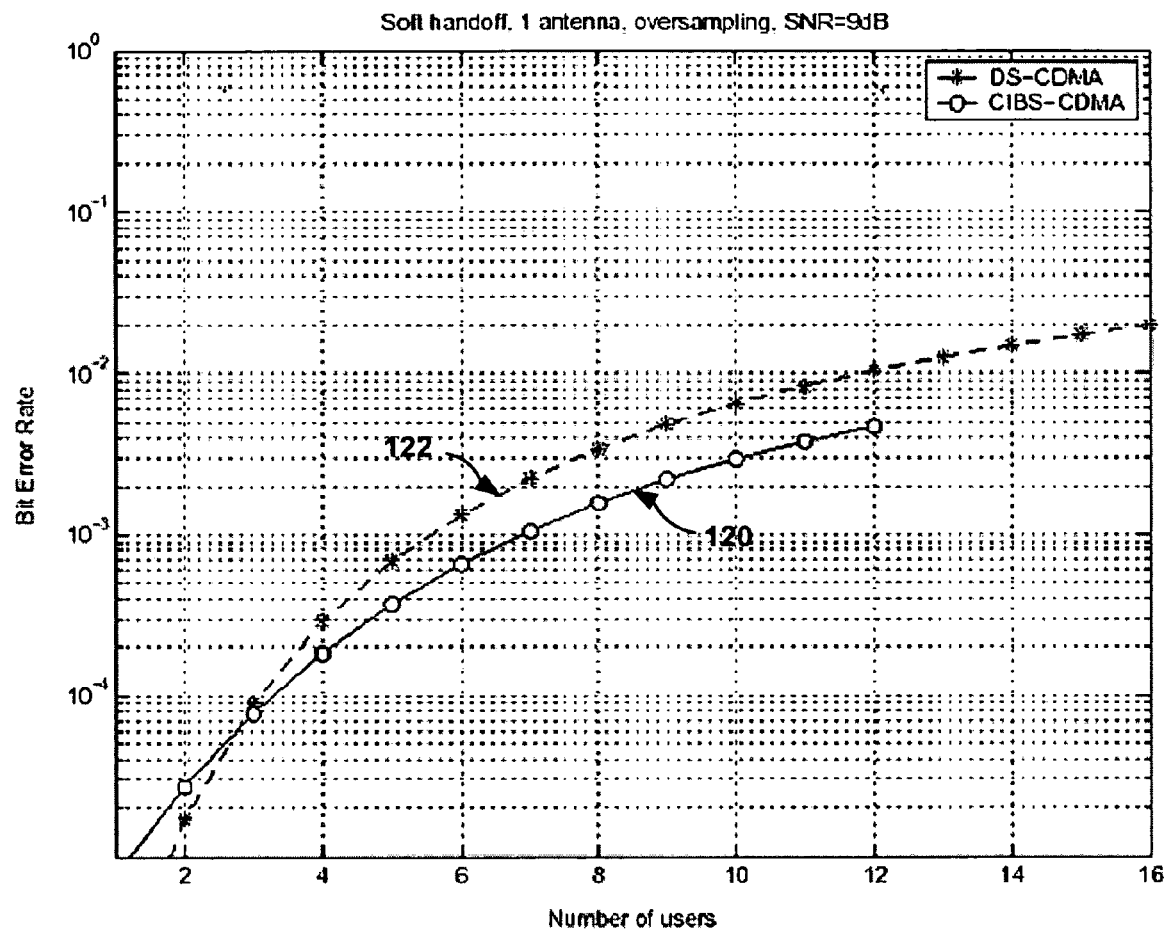

FIG. 12 is a graph comparing the BER performance of a CIBS-CDMA system with one antenna and oversampling 120 against a DS-CDMA system with one antenna and oversampling 122 for a varying number of users in the soft handoff mode at SNR=9 dB. As the system load increases above 3 users, the CIBS-CDMA system 120 performs better than the DS-CDMA system 122.

Figure 13:
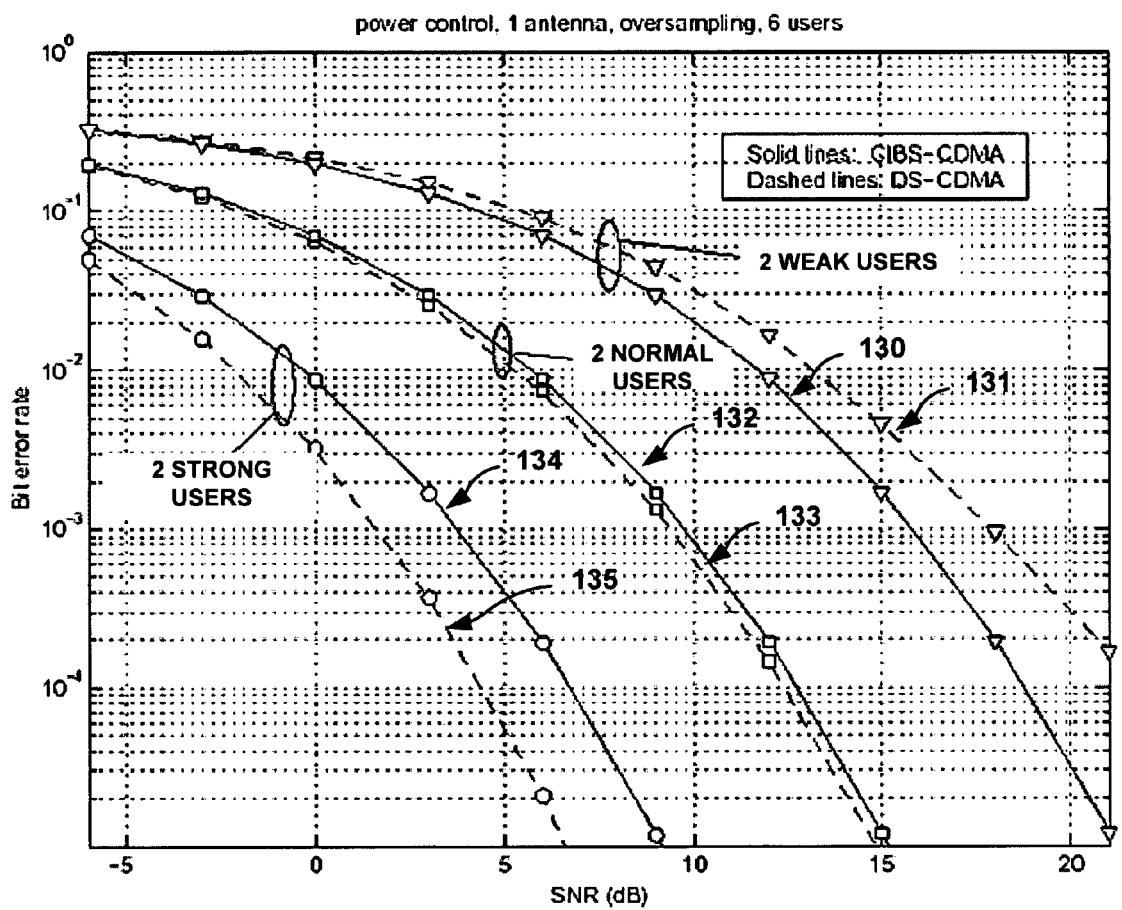
Figure 14:
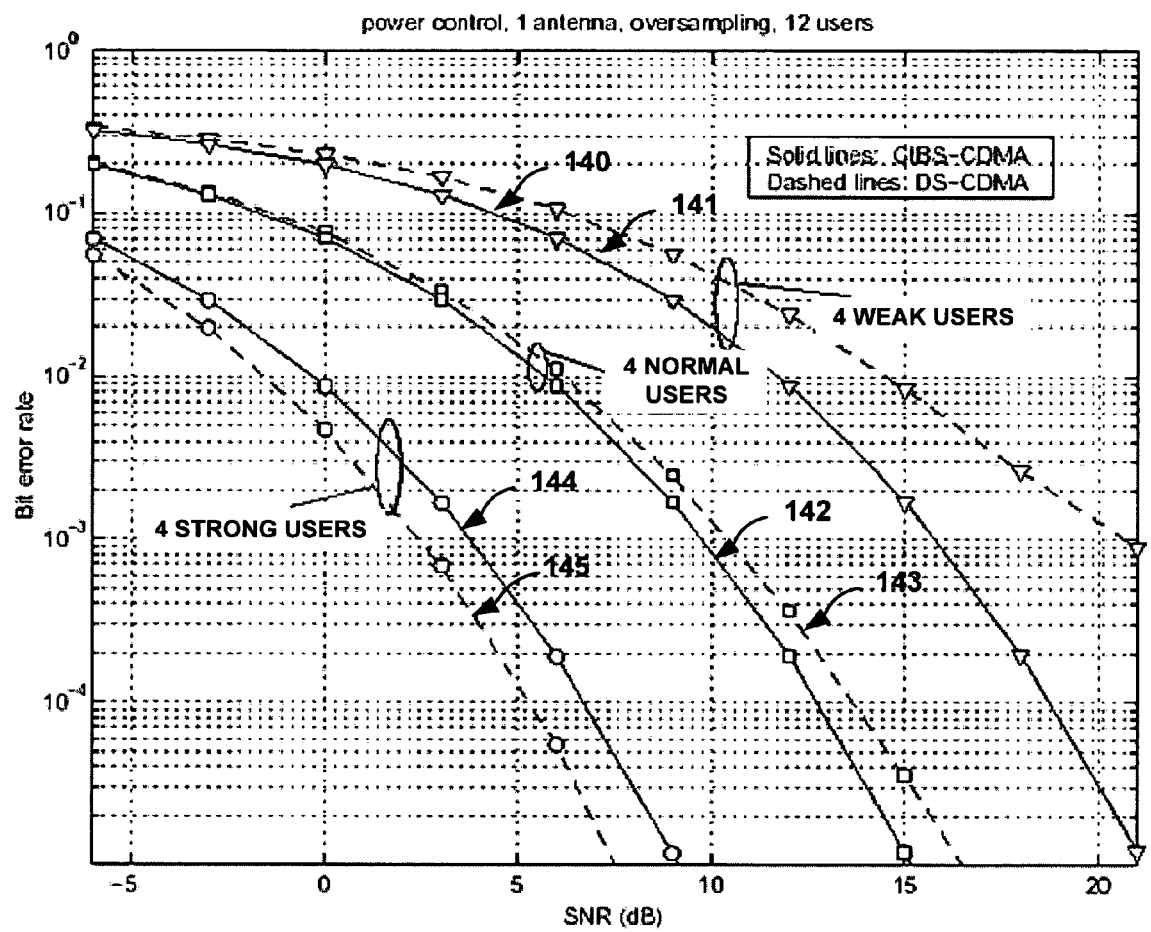

FIG. 13 and FIG. 14 are graphs comparing the BER performance of a CIBS-CDMA system against a DS-CDMA system for downlink power control with inter-cell interference omitted for brevity. Specifically, the users for each system are divided into three groups, strong users, normal users, and weak users, each having $A_u=2, 1, 0.5$, respectively. Consequently, strong users have 6 dB more power than normal users, and normal users have 6 dB more power than weak users where "strong," "normal," and "weak," refer to the relative transmit power among users. FIG. 13 and FIG. 14 show the performance of the CIBS-CDMA and DS-CDMA systems with one antenna and oversampling ($M_r=1$, $M_s=2$) for 6 and 12 users, respectively. The performance of each user in CIBS-CDMA is independent of other users. As a result, an exact 6 dB performance difference appears in FIG. 13 according to the 6 dB transmit power different among the two weak, two normal, and two strong users, 130, 132, and 134 respectively. Similarly, FIG. 14 also shows an exact 6 dB performance among the 4 weak, 4 normal, and 4 strong users, 140, 142, and 144 respectively. In contrast, the performance gap for different users is more pronounced than the transmit power differences in DS-CDMA. FIG. 13 shows the performance decrease two weak users 131 experience as a result of the boosted power of two normal users 133 and two strong users 135 in DS-CDMA. Similarly, FIG. 14 shows the performance decrease 4 weak users 141 experience as a result of the boosted power of four normal users 143 and 4 strong users 145 in DS-CDMA.

Various embodiments of the invention have been described. Throughout the Detailed Description "sub-blocks" has been generally used to reference a grouping of data. Herein, and throughout the Claims specified below, "sub-blocks" and "blocks" are interchangeable as both terms refer to a grouping of data, e.g., chips or symbols. The described techniques can be embodied in a variety of receivers used in downlink operation including cell phones, laptop computers, handheld computing devices, personal digital assistants (PDA's), and other devices. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer-readable instructions that when executed in a wireless communication device, cause the wireless communication device to carry out one or more of the techniques described herein. These and other embodiments are within the scope of the following claims.

The invention claimed is:

1. A wireless communication device comprising:
one or more antennas that receive a block-spread wireless communication signal via one or more channels;
a de-spreading unit that forms a respective stream of de-interleaved chips for each of the channels; and
a block equalizer that generates a block of symbol estimates via a single-step block equalization process by grouping the streams of de-interleaved chips and collecting chips from each of the streams of de-interleaved chips associated with different channels to form a vector of chips, wherein the block equalizer generates the block of symbol estimates by processing the vector of chips with a block equalization matrix to produce the block of symbol estimates as a vector of symbol estimates, and wherein the block equalizer forms the vector of chips according to the following equation:

$$r_\mu := \begin{bmatrix} \tilde{r}^a_{\mu,1} \\ \tilde{r}^a_{\mu,2} \\ \tilde{r}^b_{\mu,1} \\ \tilde{r}^b_{\mu,2} \end{bmatrix} = \begin{bmatrix} A^a_\mu \overline{H}^a_1 \overline{H}^b_1 0 \\ A^a_\mu \overline{H}^a_2 \overline{H}^b_2 0 \\ A^b_\mu \overline{H}^b_1 0 \overline{H}^a_1 \\ A^b_\mu \overline{H}^b_2 0 \overline{H}^a_2 \end{bmatrix} \begin{bmatrix} \tilde{s}_\mu \\ \tilde{s}^b_1 \\ \tilde{s}^a_1 \end{bmatrix} + \begin{bmatrix} (\tilde{D}^{a^H}_\mu \tilde{w}_1) \\ (\tilde{D}^{a^H}_\mu \tilde{w}_2) \\ (\tilde{D}^{b^H}_\mu \tilde{w}_1) \\ (\tilde{D}^{b^H}_\mu \tilde{w}_2) \end{bmatrix},$$

where $\tilde{r}_\mu$ represents a group of the streams of de-interleaved chips received by a $\mu^{th}$ user, $A_{\mu\_}$ represents the $\mu^{th}$ user's transmit power, $\tilde{r}^b_{\mu,m}$ represents a stream of de-interleaved chips received by the $\mu^{th}$ user via an $m^{th}$ channel from a transmitter b, $\tilde{s}^a_l$ represents an inter-cell interference from a transmitter a corresponding to transmitter b, $\tilde{w}_m$ represents noise of a wireless communication channel through the $m^{th}$ channel, and $\tilde{D}^b_\mu$ represents a de-spreading matrix applied by the de-spreading unit for the respective transmitter b.

2. The wireless communication device of claim 1, wherein the received wireless communication signal is a chip-interleaved, block-spread (CIBS) signal transmitted through a wireless communication channel via one or more transmitters.

3. The wireless communication device of claim 1, wherein the block equalizer forms the block equalization matrix in accordance with noise estimates for each of the channels.

4. The wireless communication device of claim 1, wherein the block equalizer generates the block of symbol estimates via the single-step block equalization process by generating the block of symbol estimates without first forming blocks of symbol estimates associated with one or more transmitters.

5. The wireless communication device of claim 1, wherein one or more channels comprise M channels according the following equation:

$$M = M_s M_r.$$

where $M_s$ represents an oversampling of the received wireless communication signal and $M_r$ represents the number of antennas.

6. The wireless communication device of claim 1, wherein the de-spreading unit substantially eliminates multiple user interference.

7. A wireless communication device comprising:
one or more antennas that receive a block-spread wireless communication signal via one or more channels;
a de-spreading unit that forms a respective stream of de-interleaved chips for each of the channels; and
a block equalizer that generates a block of symbol estimates from the streams of de-interleaved chips, wherein the block equalizer is a ZF block equalizer, wherein the ZF block equalizer has dimensionality K×M(K+L), where K represents a number of information symbols per block of the wireless communication signal, and L represents an estimated length of a wireless communication channel, and wherein the ZF block equalizer is given in accordance with the following equation:

$$G^{ZF}_\mu = [(A_\mu \overline{H})^H R^{-1}_\eta (A_\mu \overline{H})]^{-1} (A_\mu \overline{H})^H R^{-1}_\eta,$$

where $A_\mu$ represents a $\mu^{th}$ user's transmit power, $\eta_\mu[i]$ is an additive noise of the wireless communication channel after passing through the de-spreading unit, $R_\eta$ is a correlation of $\eta_\mu[i]$, and $\overline{H}$ has dimensionality M(K+L)×K and represents a column vector of M Toeplitz matrices with dimensionality (K+L)×K.

8. A wireless communication device comprising:
one or more antennas that receive a block-spread wireless communication signal via one or more channels;
a de-spreading unit that forms a respective stream of de-interleaved chips for each of the channels; and
a block equalizer that generates a block of symbol estimates from the streams of de-interleaved chips, wherein the block equalizer is an MMSE block equalizer, wherein the MMSE block equalizer has dimensionality K×M(K+L), where K represents a number of information symbols per block of the wireless communication signal, and L represents an estimated length of a wireless communication channel, and wherein the MMSE block equalizer is given in accordance with the following equation:

$$G^{MMSE}_\mu = \left[(A_\mu \overline{H})^H R^{-1}_\eta (A_\mu \overline{H}) + \frac{1}{\sigma^2_s} I_K\right]^{-1} (A_\mu \overline{H})^H R^{-1}_\eta,$$

where $A_\mu$ represents a $\mu^{th}$ user's transmit power, $\eta_\mu[i]$ is an additive noise of the wireless communication channel after passing through the de-spreading unit, $R_\eta$ is a correlation of $\eta_\mu[i]$, $\overline{H}$ has dimensionality M(K+L)×K and represents a column vector of M Toeplitz matrices with dimensionality (K+L)×K, $\sigma^2_s$ represents a variance of the symbols in the received wireless communication signal, and $I_K$ represents an identity matrix with size K×K.

9. The wireless communication device of claim 1, wherein the block equalizer is one of a linear equalizer, a non-linear equalizer, or a serial equalizer.

10. The wireless communication device of claim 1, wherein the block equalizer is one of a block Decision Feedback Equalizer or a probabilistic data association equalizer.

11. The wireless communication device of claim 1, wherein the wireless communication device comprises a mobile device.

12. The wireless communication device of claim 1,
wherein the de-spreading unit and the block equalizer comprise executable instructions, and
wherein the wireless communication device comprises a digital signal processor to execute the instructions.

13. A method comprising:
receiving a block-spread wireless communication signal via one or more channels;
de-spreading the received signal to form a respective stream of de-interleaved chips for each of the one or more channels; and
subsequent to de-spreading the received signal, performing a single-step block equalization process to generate a block of symbol estimates from the streams of de-interleaved chips by (i) collecting chips from each of the streams of de-interleaved chips associated with different channels to form a vector of chips, and (ii) processing the vector of chips with a block equalization matrix to produce the block of symbol estimates as a vector of symbol estimates,
wherein forming the vector of chips occurs in accordance with the following equation:

$$r_\mu := \begin{bmatrix} \tilde{r}^a_{\mu,1} \\ \tilde{r}^a_{\mu,2} \\ \tilde{r}^b_{\mu,1} \\ \tilde{r}^b_{\mu,2} \end{bmatrix} = \begin{bmatrix} A^a_\mu \overline{H}^a_1 \overline{H}^b_1 0 \\ A^a_\mu \overline{H}^a_2 \overline{H}^b_2 0 \\ A^b_\mu \overline{H}^b_1 0 \overline{H}^a_1 \\ A^b_\mu \overline{H}^b_2 0 \overline{H}^a_2 \end{bmatrix} \begin{bmatrix} \tilde{s}_\mu \\ \tilde{s}^b_1 \\ \tilde{s}^a_1 \end{bmatrix} + \begin{bmatrix} (\tilde{D}^{aH}_\mu \tilde{w}_1) \\ (\tilde{D}^{aH}_\mu \tilde{w}_2) \\ (\tilde{D}^{bH}_\mu \tilde{w}_1) \\ (\tilde{D}^{bH}_\mu \tilde{w}_2) \end{bmatrix},$$

where $\tilde{r}_\mu$ represents a group of the streams of de-interleaved chips received by a $\mu^{th}$ user, $A_\mu$ represents the $\mu^{th}$ user's transmit power, $\tilde{r}^b_{\mu,m}$ represents a stream of de-interleaved chips received by the $\mu^{th}$ user via an $m^{th}$ channel from a transmitter b, $\tilde{s}^a_1$ represents an inter-cell interference from a transmitter a corresponding to transmitter b, $\tilde{w}_m$ represents noise of a wireless communication channel through the $m^{th}$ channel, and $\tilde{D}^b_\mu$ represents a de-spreading matrix applied by the de-spreading unit for the respective transmitter b.

14. The method of claim 13, wherein the received wireless communication signal is a chip-interleaved, block-spread (CIBS) signal transmitted through a wireless communication channel via one or more transmitters.

15. The method of claim 13, wherein performing a single-step block equalization process comprises:
grouping the streams of de-interleaved chips and
generating the block of symbol estimates from the group of de-interleaved chips.

16. The method of claim 13, further comprising forming the block equalization matrix in accordance with noise estimates for each of the channels.

17. The method of claim 13, wherein one or more channels comprise M channels according the following equation:

$M=M_s M_r.$ where $M_s$ represents an oversampling of the received wireless communication signal and $M_r$ represents the number of antennas.

18. The method of claim 13, wherein de-spreading the received signal substantially eliminates multiple user interference.

19. A method comprising:
receiving a block-spread wireless communication signal via one or more channels;
de-spreading the received signal to form a respective stream of de-interleaved chips for each of the one or more channels; and
subsequent to de-spreading the received signal, performing a block equalization process to generate a block of symbol estimates from the streams of de-interleaved chips,
wherein performing the block equalization process comprises applying a block equalization matrix with dimensionality K×M(K+L), where K represents a number of information symbols per block of the wireless communication signal, and L represents an estimated length of a wireless communication channel, and
wherein the block equalization matrix is a ZF block equalizer that is given in accordance with the following equation:

$$G^{ZF}_\mu = \left[(A_\mu \overline{H})^H R^{-1}_\eta (A_\mu \overline{H})\right]^{-1} (A_\mu \overline{H})^H R^{-1}_\eta,$$

where $A_\mu$ represents a $\mu^{th}$ user's transmit power, $\eta_\mu[i]$ is an additive noise of the wireless communication channel after passing through the de-spreading unit, $R_\eta$ is a correlation of $\eta_\mu[i]$, and $\overline{H}$ has dimensionality M(K+L)×K and represents a column vector of M Toeplitz matrices with dimensionality (K+L)×K.

20. A method comprising:
receiving a block-spread wireless communication signal via one or more channels;
de-spreading the received signal to form a respective stream of de-interleaved chips for each of the one or more channels; and
subsequent to de-spreading the received signal, performing a block equalization process to generate a block of symbol estimates from the streams of de-interleaved chips,
wherein performing the block equalization process comprises applying a block equalization matrix with dimensionality K×M(K+L), where K represents a number of information symbols per block of the wireless communication signal, and L represents an estimated length of a wireless communication channel, and
wherein the block equalization matrix is an MMSE block equalizer that is given in accordance with the following equation:

$$G^{MMSE}_\mu = \left[(A_\mu \overline{H})^H R^{-1}_\eta (A_\mu \overline{H}) + \frac{1}{\sigma^2_s} I_K\right]^{-1} (A_\mu \overline{H})^H R^{-1}_\eta,$$

where $A_\mu$ represents a $\mu^{th}$ user's transmit power, $\eta_\mu[i]$ is an additive noise of the wireless communication channel after passing through the de-spreading unit, $R_\eta$ is a correlation of $\eta_\mu[i]$, $\overline{H}$ has dimensionality M(K+L)×K and represents a column vector of M Toeplitz matrices with dimensionality (K+L)×K, $\sigma^2_s$ represents a variance of the symbols in the received wireless communication signal, and $I_K$ represents an identity matrix with size K×K.

21. The method of claim 13, wherein the block equalizer is one of a linear equalizer, a non-linear equalizer, or a serial equalizer.

22. The method of claim 13, wherein the block equalizer is one of a block Decision Feedback Equalizer or a probabilistic data association equalizer.

23. A computer-readable medium comprising instructions to cause a programmable processor to:
    receive via one or more channels a chip-interleaved, block-spread (CIBS) wireless communication signal formed according to interleaved chips;
    de-spread the received signal to form a stream of de-interleaved chips for each of the one or more channels; and
    subsequent to de-spreading the received signal, perform a single-step block equalization process to generate a block of symbol estimates from the streams of de-interleaved chips by:
    (i) collecting chips from each of the streams of de-interleaved chips associated with different channels to form a vector of chips, and
    (ii) processing the vector with a block equalization matrix to produce the block of symbol estimates as a vector of symbol estimates,
    wherein forming the vector of chips occurs in accordance with the following equation:

$$r_\mu := \begin{bmatrix} \tilde{r}_{\mu,1}^a \\ \tilde{r}_{\mu,2}^a \\ \tilde{r}_{\mu,1}^b \\ \tilde{r}_{\mu,2}^b \end{bmatrix} = \begin{bmatrix} A_\mu^a \overline{H}_1^a & \overline{H}_1^b & 0 \\ A_\mu^a \overline{H}_2^a & \overline{H}_2^b & 0 \\ A_\mu^b \overline{H}_1^b & 0 & \overline{H}_1^a \\ A_\mu^b \overline{H}_2^b & 0 & \overline{H}_2^a \end{bmatrix} \begin{bmatrix} \tilde{s}_\mu \\ \tilde{s}_1^b \\ \tilde{s}_1^a \end{bmatrix} + \begin{bmatrix} \left(\tilde{D}_\mu^{a^H} \tilde{w}_1\right) \\ \left(\tilde{D}_\mu^{a^H} \tilde{w}_2\right) \\ \left(\tilde{D}_\mu^{b^H} \tilde{w}_1\right) \\ \left(\tilde{D}_\mu^{b^H} \tilde{w}_2\right) \end{bmatrix},$$

where $\tilde{r}_\mu$ represents a group of the streams of de-interleaved chips received by a $\mu^{th}$ user, $A_\mu$ represents the $\mu^{th}$ user's transmit power, $\tilde{r}_{\mu,m}^b$ represents a stream of de-interleaved chips received by the $\mu^{th}$ user via an $m^{th}$ channel from a transmitter b, $\tilde{s}_l^a$ represents an inter-cell interference from a transmitter a corresponding to transmitter b, $\tilde{w}_m$ represents noise of a wireless communication channel through the $m^{th}$ channel, and $\mathcal{D}_\mu^b$ represents a de-spreading matrix applied by the de-spreading unit for the respective transmitter b.

24. The computer-readable medium of claim 23, wherein the received wireless communication signal is transmitted through a wireless communication channel via one or more transmitters.

* * * * *